United States Patent
Dodd

(10) Patent No.: US 11,244,457 B2
(45) Date of Patent: Feb. 8, 2022

(54) METHOD, APPARATUS AND COMPUTER PROGRAM FOR IMAGE PROCESSING INCLUDING GENERATING A DIFFERENT IMAGE OF AT LEAST ONE OBJECT

(71) Applicants: Sony Corporation, Tokyo (JP); Sony Europe B.V., Weybridge (GB)

(72) Inventor: Luke Dodd, Basingstoke (GB)

(73) Assignees: Sony Corporation, Tokyo (JP); Sony Europe B.V., Weybridge (GB)

( * ) Notice: Subject to any disclaimer, the term of this patent is extended or adjusted under 35 U.S.C. 154(b) by 159 days.

(21) Appl. No.: 16/671,214

(22) Filed: Nov. 1, 2019

(65) Prior Publication Data
US 2020/0151881 A1 May 14, 2020

(30) Foreign Application Priority Data
Nov. 9, 2018 (GB) .................................... 1818313

(51) Int. Cl.
| | | |
|---|---|---|
| *G06T 7/11* | (2017.01) | |
| *G06T 7/194* | (2017.01) | |
| *G06T 7/73* | (2017.01) | |
| *G06T 7/90* | (2017.01) | |

(Continued)

(52) U.S. Cl.
CPC .................. *G06T 7/11* (2017.01); *G06T 3/40* (2013.01); *G06T 7/194* (2017.01); *G06T 7/74* (2017.01); *G06T 7/90* (2017.01); *G06T 17/00* (2013.01); *G06T 2207/20132* (2013.01); *G06T 2207/30196* (2013.01); *G06T 2207/30221* (2013.01)

(58) Field of Classification Search
CPC .. G06T 7/01; G06T 7/194; G06T 7/74; G06T 7/90; G06T 3/40; G06T 17/00; G06T 2207/20132; G06T 2207/30196; G06T 2207/30221
See application file for complete search history.

(56) References Cited

U.S. PATENT DOCUMENTS

| | | | |
|---|---|---|---|
| 9,679,215 B2 * | 6/2017 | Holz | ................... G06K 9/00523 |
| 9,946,076 B2 * | 4/2018 | Smits | ................... H04N 13/363 |
| 10,062,133 B1 * | 8/2018 | Mishra | ................... G06T 11/60 |

(Continued)

FOREIGN PATENT DOCUMENTS

EP    2 395 478 A1   12/2011

OTHER PUBLICATIONS

British Examination Search Report dated May 7, 2019 in GB Application 1818313.7, filed on Nov. 9, 2018.

(Continued)

*Primary Examiner* — Mia M Thomas
(74) *Attorney, Agent, or Firm* — Oblon, McClelland, Maier & Neustadt, L.L.P.

(57) ABSTRACT

A method of image processing is provided, the method comprising the steps of locating at least one object in an image of a scene, selecting at least a portion of the image of the scene in accordance with the location of the at least one object in the image of the scene, generating a different image of the at least one object in accordance with the selected portion of the image of the scene, the different image comprising the at least one object and being smaller than the image of the scene and detecting a plurality of points corresponding to parts of the at least one object located in the scene using the different image of the at least one object.

18 Claims, 6 Drawing Sheets

(51) Int. Cl.
  *G06T 3/40* (2006.01)
  *G06T 17/00* (2006.01)

(56) References Cited

U.S. PATENT DOCUMENTS

| | | | | |
|---|---|---|---|---|
| 10,142,522 | B2* | 11/2018 | Ilic | G06K 9/00463 |
| 10,154,194 | B2* | 12/2018 | Gilpin | H04N 5/77 |
| 10,298,898 | B2* | 5/2019 | Ilic | G06T 3/4038 |
| 10,491,887 | B2* | 11/2019 | Haimovitch-Yogev | H04N 5/23229 |
| 10,599,764 | B2* | 3/2020 | Campbell | G06K 9/00449 |
| 10,685,418 | B2* | 6/2020 | Mishra | G06T 3/40 |
| 10,740,959 | B2* | 8/2020 | Johnson | H04N 5/232939 |
| 10,802,708 | B2* | 10/2020 | Lee | H04M 1/72436 |
| 10,812,562 | B1* | 10/2020 | Mitchell | H04L 65/1089 |
| 2012/0237114 | A1* | 9/2012 | Park | G06T 7/593 382/154 |
| 2013/0181989 | A1* | 7/2013 | Agarwal | G06T 17/00 345/420 |
| 2013/0271458 | A1 | 10/2013 | Andriluka et al. | |
| 2015/0077520 | A1* | 3/2015 | Ohba | G06F 3/017 348/47 |
| 2016/0005280 | A1* | 1/2016 | Laska | G08B 13/19645 386/230 |
| 2016/0117827 | A1* | 4/2016 | Bae | G06K 9/00771 382/103 |
| 2016/0328827 | A1* | 11/2016 | Ilic | H04N 5/2624 |
| 2017/0154408 | A1* | 6/2017 | Jobara | G06T 3/4038 |
| 2017/0161547 | A1 | 6/2017 | Segawa et al. | |
| 2018/0260668 | A1* | 9/2018 | Shen | G06N 3/084 |
| 2019/0220685 | A1* | 7/2019 | Uchiyama | G06K 9/00362 |
| 2020/0314435 | A1* | 10/2020 | Tourapis | G06T 7/74 |
| 2021/0144353 | A1* | 5/2021 | Ilic | G06K 9/18 |

OTHER PUBLICATIONS

Iqbal, U. et al. "Multi-Person Pose Estimation with Local Joint-to-Person Associations", Computer Vision ECCV 2016 Workshops, vol. 9914, 2016, 15 pages.

* cited by examiner

METHOD, APPARATUS AND COMPUTER PROGRAM FOR IMAGE PROCESSING INCLUDING GENERATING A DIFFERENT IMAGE OF AT LEAST ONE OBJECT

CROSS REFERENCE TO RELATED APPLICATIONS

The present application claims priority to United Kingdom application 1818313.7 filed on 9 Nov. 2018, the contents of which being incorporated herein by reference in its entirety.

BACKGROUND

Field of the Disclosure

The present disclosure relates to a method, apparatus and system for image processing.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In recent years, there has been an increase in the quality of images captured by image capture devices. For example users have begun to expect that image capture devices, such as still image capture devices or motion capture devices, will provide high resolution images of the scene. The increase in the resolution of the images captured by the image capture devices leads to an increase in the computational overheads required to store and process the images obtained from these devices. In particular image capture systems with multiple image capture devices have particularly high computational demands.

Furthermore, there is a desire to provide additional layers of service to the user substantially at the time when the images have been captured. In sporting matches or the like, the user expects that a number of features are available based on a substantially real time analysis of the images. For example, it may be desirable to perform image analysis on the images captured by the image capture devices in order to determine whether certain events have occurred in the images, identify objects within the images, or analyse the status of certain objects within the images. Such computational analysis may also be desirable when processing images captured by closed circuit television cameras (CCTV) for security purposes or the like.

However, the content of the images captured by image capture systems in these situations is inherently complex. For example, when such images comprise a large number of objects, said objects may often become difficult to identify and discriminate between, especially when the position of objects in the scene varies significantly over time. Accordingly, it is necessary to perform computationally expensive image processing techniques on the images obtained from the image capture systems in order to attempt to provide analysis of the image content. Coupled with the increase in image quality and resolution, the intensity of the computational processing which must be performed on the images thus further exacerbates the issue of providing the required processing on the images captured by the image captured devices in a substantially real time environment.

It is an aim of the present disclosure to address these issues.

SUMMARY

According to embodiments of the disclosure, a method of image processing is provided, the method comprising locating at least one object in an image of a scene, selecting at least a portion of the image of the scene in accordance with the location of the at least one object in the image of the scene, generating a different image of the at least one object in accordance with the selected portion of the image of the scene, the different image comprising the at least one object and being smaller than the image of the scene and detecting a plurality of points corresponding to parts of the at least one object located in the scene using the different image of the at least one object.

According to embodiments of the disclosure, an apparatus for image processing is provided, the apparatus comprising circuitry configured to locate at least one object in an image of a scene, select at least a portion of the image of the scene in accordance with the location of the at least one object in the image of the scene, generate a different image of the at least one object in accordance with the selected portion of the image of the scene, the different image comprising the at least one object and being smaller than the image of the scene and detect a plurality of points corresponding to parts of the at least one object located in the scene using the different image of the at least one object.

According to embodiments of the disclosure, a computer program product comprising instructions which, when the program is executed by a computer, cause the computer to carry out a method of image processing is provided, the method comprising locating at least one object in an image of a scene, selecting at least a portion of the image of the scene in accordance with the location of the at least one object in the image of the scene, generating a different image of the at least one object in accordance with the selected portion of the image of the scene, the different image comprising the at least one object and being smaller than the image of the scene and detecting a plurality of points corresponding to parts of the at least one object located in the scene using the different image of the at least one object.

Advantageous Effects

According to embodiments of the disclosure, it is possible to more efficiently perform the image processing required in order to provide detailed analysis of objects in an image of a scene, such that the detailed analysis can be provided in substantially real time.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
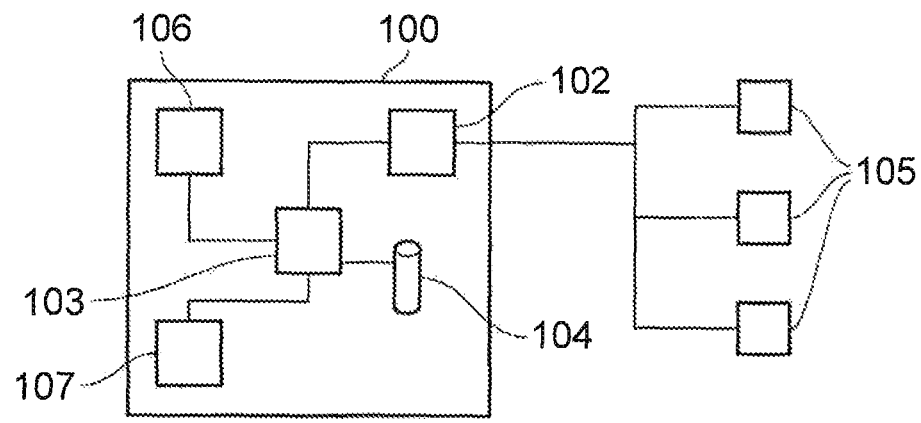
FIG. 1 shows an apparatus according to embodiments of the disclosure.

Referring now to the drawings, wherein like reference numerals designate identical or corresponding parts throughout the several views.

Referring to FIG. 1, an apparatus 100 according to embodiments of the disclosure is shown. Typically, an apparatus 100 according to embodiments of the disclosure is a computer device such as a personal computer or a terminal connected to a server. Indeed, in embodiments, the apparatus may also be a server. The apparatus 100 is controlled using a microprocessor or other processing circuitry 103.

The processing circuitry 103 may be a microprocessor carrying out computer instructions or may be an Application Specific Integrated Circuit. The computer instructions are stored on storage medium 104 which may be a magnetically readable medium, optically readable medium or solid state type circuitry. The storage medium 104 may be integrated into the apparatus 100 or may be separate to the apparatus 100 and connected thereto using either a wired or wireless connection. The computer instructions may be embodied as computer software that contains computer readable code which, when loaded onto the processor circuitry 103, configures the processor circuitry 103 to perform a method according to embodiments of the disclosure.

Additionally connected to the processor circuitry 103, is a user input unit 106. The user input unit 106 may be a touch screen or may be a mouse or stylist type input device. The user input 106 may also be a keyboard or any combination of these devices.

Communication circuitry 102 is also coupled to the processing circuitry 103. The communication circuitry 102 may provide a connection to a Local Area Network or a Wide Area Network such as the Internet or a Virtual Private Network or the like. For example, the communication circuitry 102 may be connected to broadcasting infrastructure allowing the processor circuitry 103 to communicate with other devices or infrastructure equipment in order to obtain or provide relevant data. The communication circuitry 102 may therefore be behind a firewall or some other form of network security.

Furthermore, as shown in FIG. 1, the network connection 102 may be connected to a plurality of image capture devices 105. Although shown separate from the apparatus 100, the image capture devices 105 may additionally be integrated into the apparatus 100. When separate from the apparatus 100, the image capture devices 105 may be connected to the device 100 through the communication circuitry 102 by either a wired or wireless connection. The image capture devices 105 may be distributed around a stadium or the like, and be configured to capture a plurality of views of the target object. It will be appreciated that the form of the image capture devices 105 is not particularly limited. However, the image capture devices 105 may capture still images of the target object, or may capture a stream of images forming a video of the target object. The image capture devices 105 may, alternatively, be further configured to capture sound from the scene. The image captured by the image captured devices 105 may, for example, be a high resolution image or a 4K image of the target object.

Additionally coupled to the processing circuitry 103, is a display device 107. The display device, although shown integrated into the apparatus 100, may additionally be separate to the apparatus 100 and may be a monitor or some kind of device allowing the user to visualise the operation of the system. In addition, the display device 107 may be a printer or some other device allowing relevant information generated by the apparatus 100 to be viewed by the user or by a third party.

Detecting a Plurality of Points

As noted above, it is desirable to reduce the computational overheads required in order to provide detailed analysis of objects in an image of a scene, such that the detailed analysis of the objects may be provided in substantially real time. Accordingly, a method of image processing is provided by embodiments of the disclosure.

Figure 2A:
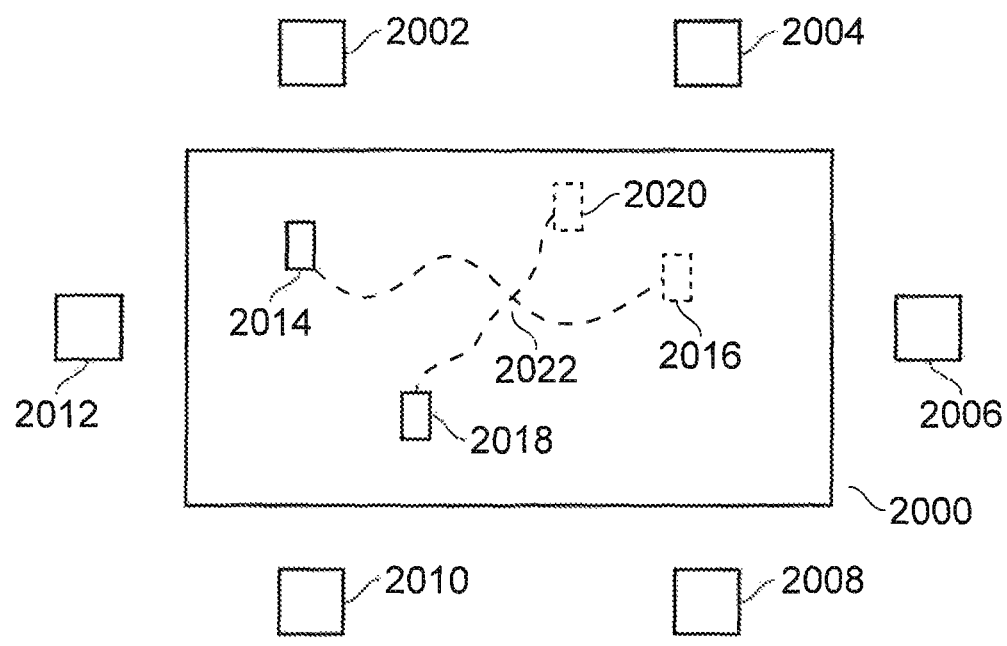
FIG. 2A illustrates a situation to which embodiments of the present disclosure may be applied.

FIG. 2A illustrates a situation to which embodiments of the present disclosure may be applied. In this situation, a series of image capture devices 2002 to 2012 are provided at a number of locations around a scene 2000. It will be appreciated that both the number and location of the plurality of image capture devices which are provided is not limited to that illustrated in this situation. For example, the number of image capture devices may be increased or decreased as desired in accordance with the situation to which the embodiment of the disclosure is applied. The images captured by the image capture devices 2002 to 2012 may comprise a number of different views of the scene. Alternatively, in certain situations, a single image capture device may be provided. The images captured by the image capture devices 2002 to 2012 may then be communicated to a device 100 as illustrated in accordance with FIG. 1 of the disclosure.

It will further be appreciated that the form of the image capture devices themselves is not particularly limited. In fact, any type of image capture device may be used in accordance with embodiments of the disclosure. For example, the image capture devices may capture high resolution images of the scene, 4K images of the scene or the like.

As described above, in this situation, the image capture devices capture images of the scene 2000. The scene may be, for example, a sports stadium or the like. That is, the cameras may be located around the sports stadium and capture images of a central area within the stadium such as a football pitch or the like. Alternatively, the scene may be any other suitable environment, such as a shopping mall; in this situation, the cameras may be located around the shopping mall and capture images of a central location within the mall. Of course, it will be appreciated that the present disclosure is not particularly limited to these situations.

As such, the image capture devices 2002 to 2012 capture images of the scene 2000 and provide these images to an apparatus 100, such as the apparatus 100 described above with reference to FIG. 1 of the disclosure.

In the situation illustrated in FIG. 2A there are two objects 2014 and 2018 provided in the scene. These objects may be objects such as equipment, people or players located within the scene 2000. For example, in a sporting event such as a football match or the like, the objects 2014 and 2018 may comprise players engaged in playing the football match. The plurality of cameras 2002 to 2012 are therefore configured to capture images of the objects 2014 and 2018 in the scene. It will be appreciated that the image of objects and the types of object are not particularly limited in this respect, and will vary in accordance with the situation.

It will further be appreciated that certain objects, such as people, may not remain stationary within the scene, such that their positon in the scene may vary over time. For example, as illustrated in the situation according to FIG. 2A, the object 2014 may be at an initial location 2016 at a time when a first series of images are captured, and may move across the scene to the subsequent location of object 2014 shown in FIG. 2A at a later time corresponding to a time when a further series of images are captured. Likewise, object 2018 may start at an initial location 2020 and move to the subsequent location illustrated for object 2018 during this time period.

At a given time during this time period, the paths of the objects 2014 and 2016 may overlap. That is, in a football match or the like, the players 2014 and 2018 may be located in close proximity to each other in the view provided by at least one of the plurality of camera 2002 to 2012. Thus, it may be difficult for an image processing system to discriminate between the paths of the players 2014 and 2016 at this time. The likelihood of instances of visual overlap between objects within the scene may increase in accordance with the number of objects located in the scene.

As described above, it may be desirable to obtain a certain level of information about the objects in the scene in substantially real time. In the situation of a football match or the like, it may be desirable to determine a condition of the players as the match progresses. For example, it may be desirable to determine certain safety critical information regarding the players 2014 and 2018, such as whether the player is exhausted, has sustained an injury (such as concussion) or the like.

Alternatively or in addition, it may be desirable to determine certain status information regarding the performance of the players 2014 and 2018 during the match. For example, considering a sporting event such as a football match, it may be desirable to determine whether a football player has violated a rule of the football match, such playing the ball while being located offside, or the like.

Such information regarding the condition or status of a player may be determined by a detailed analysis of the position, pose and movement of the player in question. For example, a player who is exhausted may have a distinct body pose when compared to a player who has only recently begun playing the game.

According to embodiments of the disclosure, it is possible to rapidly locate the players 2014 and 2018 within the image of the scene. These players can then be selected, and a new different image is generated from the image of the scene, the different image comprising the players 2014 and 2018 and being smaller than the original image of the scene.

Figure 2B:
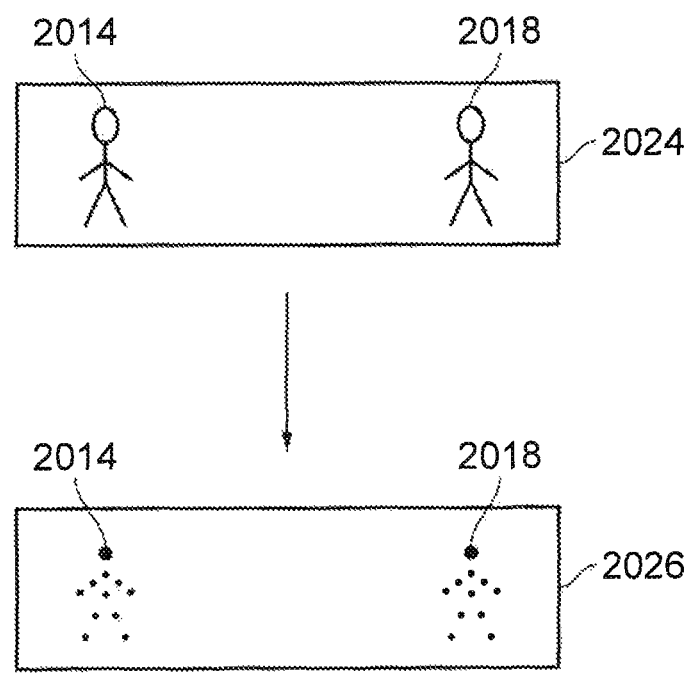
FIG. 2B illustrates a situation to which embodiments of the present disclosure may be applied.

FIG. 2B illustrates a situation to which embodiments of the present disclosure may be applied. That is, an example of the different image 2024 of the scene for the situation illustrated with reference to FIG. 2A is provided in FIG. 2B. The illustrated different image 2024 of the scene 2000 comprises the players 2014 and 2018 in isolation from the original image of the scene. That is, both of the players 2014 and 2018 are provided in the different image 2024, and the different image 2024 is smaller than the original image of the scene 2000. It will be appreciated that the different image 2024 is merely an example of one type of representation of the different image; the form and configuration of the different image is not particularly limited in this respect. Further details regarding the different image and its generation are provided below.

From this new different image which has been generated, a plurality of points corresponding to the parts of a player, such as the player's head, torso, or limbs, can be determined. That is, the features of the players 2014 and 2018 can be rapidly determined from the different image 2024 which has a size less than the size of the original image. An illustration of the different image 2024 wherein the parts of the players 2014 and 2018 have been located is illustrated as image 2026 in FIG. 2B. In this image, those parts of the player 2014 and the player 2018 which are required to determine the certain safety critical information or certain status information regarding the players have been identified.

As such, according to embodiments of the disclosure, it is possible to efficiently perform the image processing required in order to provide detailed analysis of objects in an image of a scene, such that the detailed analysis of the objects can be provided substantially real time.

Method of Image Processing

Figure 3:
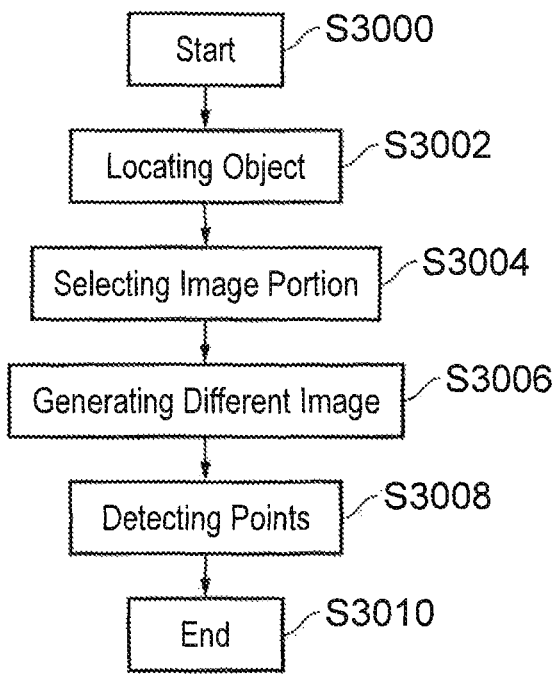
FIG. 3 illustrates a method of image processing according to embodiments of the disclosure.

FIG. 3 illustrates a method of image processing according to embodiments of the disclosure. The method according to embodiments of the disclosure may be performed on the device 100 as according to FIG. 1.

In accordance with embodiments of the disclosure, the method starts at step S3000 and progress to step S3002. Step S3002 comprises locating at least one object in an image of a scene. Step S3004 comprises selecting at least a portion of the image of the scene in accordance with the location of the at least one object in the image of the scene. Step 3006 comprises generating a different image of the at least one object in accordance with the selected portion of the image of the scene, the different image comprising the at least one object and being smaller than the image of the scene. Step S2008 comprises detecting a plurality of points corresponding to parts of the at least one object in the image of the scene using the different image of the at least one object Finally, the method ends with step S3010.

The method steps S3002 to S3008 are described in detail below, with reference to the situation illustrated in FIG. 2A.

Locating Objects in the Scene

As described above, the method step S3002 comprises locating at least one object in an image of a scene. That is, an image from at least one of the image capture devices 2002 to 2012 may be received by the device 100. Of course, it will be appreciated that the method according to the present embodiment is not particularly limited in this regard, and an image may be received from any image capture device or, alternatively, may be provided to the device 100 by any suitable means in accordance with the situation to which the method according to the present embodiment of the disclosure is being applied. Regardless of the manner by which the image is obtained, the method according to the present embodiment comprises locating at least one object in the image of the scene.

Consider, for example, an image of the scene 2000 captured by image capture device 2002. In order to perform the requisite image processing on the image, it is first necessary to determine the approximate locations of objects within the scene. That is, while a scene may comprise a number of objects, the method according to embodiments of the disclosure comprises determining the location of objects in the scene which correspond to certain objects of interest, or target objects. In an image of the scene 2000 illustrated in accordance with FIG. 2A, for example, the target objects correspond to players 2014 and 2018 in a sporting event such as a football match or the like. Of course, the objects in the scene are not particularly limited in this regard, and any objects within the image of the scene captured by the image capture device 2002 may be located in step S3002.

It will be appreciated that there are a number of methods which could be used in order to determine the location of objects within the scene in accordance with embodiments of the disclosure. That is, the method which is used in order to determine the location of objects within the scene is not particularly limited in this respect. Rather, for example, the method which is used may depend upon the image of the scene itself and also upon the types of objects which are to be located in that scene.

According to embodiments of the disclosure, the method of locating objects within the scene may comprise performing a foreground object extraction on the image of the scene. That is, in certain situations, such as the situation illustrated in accordance with FIG. 2A of the present disclosure, an image of the scene may comprise both foreground and background objects. Background objects, or the background of the image of the scene, may remain in substantially the same location over time. In contrast, foreground objects may represent dynamic objects for which certain changes take place over a given time duration. In certain situations, the foreground objects therefore correspond to the objects for which it is desired to determine detailed information and characteristics in accordance with embodiments of the disclosure.

Consider, for example, the situation illustrated in accordance with FIG. 2A of the present disclosure. In this situation, the objects 2014 and 2018, which may correspond to players in a sporting event such as a football match or the like, change their respective locations over time during the match. In this situation, the players 2014 and 2018 represent the foreground objects in the image. In contrast, features such as the pitch itself or people watching the football match remain substantially stationary over time. As such, these features of the scene represent background objects in the image. Identifying the foreground objects in the image, which in this situation corresponds to players 2014 and 2018, thus enables the location of the at least one objects in the image of the scene to be determined.

In order to perform the foreground extraction, the method according to embodiments of the disclosure may comprise performing at least one of a chromatic distribution analysis of the image, a contrast distribution analysis of the scene or a frame differencing analysis with respect to a previous image of the scene.

For example, in order to determine the foreground objects, the method may comprise subtracting the image of the scene from a previous image or images of the scene. In this manner, objects which move across the scene from image to image will be segmented from the stationary objects in the background. Of course, once an object has been identified as a foreground object, it may be desirable to continue identifying that object as a foreground object even if that object subsequently remains stationary for a number of image frames. In this case, only if the object continues to remain stationary for a time longer than a predetermined amount of time (or a predetermined number of image frames) will the object be reclassified as part of the background of the scene.

Alternatively, or in addition, analysing the chromatic distribution of the image may enable the background of the image to be identified and subtracted from the image. For example, in the situation illustrated in accordance with FIG. 2A, background features, such as the football pitch, may have a particular chromatic distribution or colour range, which enables rapid identification of foreground objects within the image.

Alternatively or in addition, analysing the contrast distribution of the image of the scene may also enable the objects, such as players 2014 and 2018, to be identified within the scene. For example, objects located in the foreground of an image of a scene often possess a distinctive luminance contrast when compared to objects or features which are located in the background of the image of the scene. Accordingly, the relative differences between the luminance contrast of foreground and background objects in the scene may be used in order to determine the foreground objects in the scene. Of course, the particular thresholds used for the identification of the foreground objects will vary in accordance with environmental factors such as the illumination of the scene or the like.

Furthermore, while the above passages describe the determination of the objects within the scene through the use of foreground extraction, it will be appreciated that the embodiments of the disclosure are not particularly limited in this regard. For example, the method of locating objects within the scene may, alternatively or in addition, comprise comparing the image of the scene with a predetermined image of a target object.

Consider again the situation illustrated with reference to FIG. 2A of the present disclosure. In the case of an image of a sporting event, such as a football match or the like, certain objects within the scene could be recognised through comparison with a set of target images. That is, for example, in a football match, it is known that a number of players will be present in the image, alongside additional objects such as the football and the like. In this case, a set of target images, such as an image of the football, may be stored in memory, and these images could be compared with the image of the scene in order to identify the target objects within the image. Such analysis through matching the image of the scene with a set of templates may be particularly advantageous when the types of object which are likely to be present in the image of the scene are known in advance.

Of course, it will be appreciated that the method according to embodiments of the disclosure is not particularly limited in this respect, and any suitable method may be used in order to locate the at least one objects in the scene in accordance with the situation to which the method according to the embodiment of the disclosure is applied.

Once at least one object has been located in the image of the scene, the method proceeds to method step S3004.

Selecting a Portion of the Image of the Scene

As described above, the method step S3004 comprises selecting at least a portion of the image of the scene in accordance with the location of the at least one object of the scene.

Consider the situation illustrated with reference to FIG. 2A of the present disclosure. In this case, the image of the scene 2000 which is captured by an image capture device 2002 will comprise at least a portion of the scene which does not contain objects (empty portions of the football pitch, for example) and at least a portion of the scene which contains objects (players 2014 and 2018, for example). The location of the objects, such as players 2014 and 2018, has been determined in step S3002 as described above. Accordingly, it is possible to select at least the portion of the image corresponding to the location of the objects 2014 and 2018 which has been determined in step S3002.

It will be appreciated that the players 2014 and 2018 do not necessarily have a predetermined size in the image of the scene. Rather, the size of the players 2014 and 2018 will increase or decrease depending on the relative sizes of the players and their respective proximity to the image captured device. As such, when selecting the at least a portion of the image of the scene corresponding to the players 2014 and 2018, it is desirable to use an adaptive selection mechanism which is sensitive to the respective size of the player or players in the image of the scene.

For example, in certain embodiments of the disclosure, it may be desirable to select the region of the image to be as small as possible around the object which has been located in the image, while still encompassing the object itself. Selecting the portion of the image in this manner reduces the size of the image to which the subsequent methods of image processing must be applied. However, in certain situations, it may be desirable to provide a threshold region around the object which has been identified in the image. According to embodiments of the disclosure, the threshold region around the object may be of a predetermined size, or may be adaptable in accordance with the situation. This threshold region provides an error margin and thus ensures that the entirety of the object in the image will be selected.

It will further be appreciated that the region around an object which has been located in the image may be selected in accordance with any mechanism, and the method according to the present disclosure is not particularly limited in this regard. For example, a rectangular or circular region around the object may be selected, or outline of the object may be followed in order to select the location of the object in the image. The method which is used may further depend on the type of object which has been located, its respective size in the image, a desired level of accuracy or the like.

Furthermore, the method according to embodiments of the disclosure may comprise selecting a portion of the image outside a region of predetermined size around the at least one object. That is, in contrast to the method described above, which describes the selection of the object within the image, the method may, alternatively, comprise the selection of the portions of the image which do not correspond to the location of the object or objects within the image of the scene. In this case, all those portions of the image of the scene which have been determined not to comprise an object will be selected. In the situation described with reference to FIG. 2A of the present disclosure, this would correspond to the selection of all regions of the image of the scene which do not correspond to the location of either object 2014 or 2018 (that is, all the empty regions of the football pitch).

It will be appreciated that the method used, either the selection of the objects or the selection of the regions which do not contain the objects, may be determined in accordance with the situation to which the method according to embodiments of the disclosure is applied. In fact, other methods may be used in accordance with embodiments of the disclosure as required.

Furthermore, according to embodiments of the disclosure, it will be appreciated that the method may further comprise storing the location of the at least one object in the original image in a storage unit.

That is, in certain situations, it may be advantageous to store the locations of the objects which have been located in the scene in a storage unit. Such a storage unit may be the storage 104 illustrated with reference to FIG. 2 of the present disclosure, or may be a storage unit external to the device 100. Regardless, the method may comprise storing the locations of the objects in the storage unit for subsequent retrieval from the storage unit and use thereof.

For example, consider the situation illustrated with reference to FIG. 2 of the present disclosure. Once the locations of the players 2014 and 2018 in the image of the scene 2000 have been determined, the locations of the players at the time the image was captured may be stored in the storage unit. Such storage enables the comparison of the locations of the objects with a previously determined location of objects in the image (such as locations 2016 and 2020 for objects 2014 and 2016 respectively). Comparison with the previous locations of objects within the image may advantageously improve the speed and accuracy of locating objects in the image.

Once the region of the image has been selected in accordance with the location of the at least one object in the image of the scene, the method proceeds to step S3006.

Generating a Different Image of the Scene

As described above, the method step S3006 comprises generating a different image of the at least one object in accordance with the selected portion of the image of the scene, the different image comprising the at least one object and being smaller than the image of the scene.

As described with reference to the situation illustrated with reference to FIGS. 2A and 2B, the fact that the plurality of points are detected in the different image 2024 which has been generated, that different image being smaller than the image of the scene 2000 and comprising the players 2014 and 2018, ensures that it is possible to more efficiently perform the image processing required in order to provide detailed analysis of objects in an image of a scene in substantially real time. However, it will be appreciated that the method used to generate this different image, and the precise form of that different image, is not particularly limited, and may vary in accordance with the situation to which the method according to embodiments of the disclosure is being applied.

For example, according to embodiments of the disclosure, when the portion of the image has been selected by selecting a region comprising the at least one object, the method of generating the different image of the scene according to embodiments of the disclosure may comprise deleting the portion of the image of the scene outside the selected region of the image of the scene. That is, the different image, such as the image 2024 described above with reference to FIG. 2B, may be generated by creating an image where all the regions which have not been selected and which do not contain an object (such as players 2014 and 2018) have been deleted.

In contrast, for example, according to embodiments of the disclosure, when the portion of the image has been selected by selecting the portions of the image outside a region of the image of predetermined size around the at least one object, the method of generating the different image of the scene according to embodiments of the disclosure may comprise deleting the selected portion of the image of the scene. That is, the different image, such as the image 2024 described above with reference to FIG. 2B, may be generated by creating an image where the selected region (corresponding to those portions of the image which do not contain an object) have been deleted.

In this manner, the different image of the scene, such as that illustrated with reference to FIG. 2B above, represents a cut-out of the at least one object of the scene, the different image comprising the at least one object and being smaller than the image of the scene 2000.

Of course, it will be appreciated that the present embodiment is not limited to these methods of generating the different image. Rather, any such method of generating the different image, the different image being an image comprising the at least one object and being smaller than the image of the scene, may be applied.

Furthermore, prior to proceeding to method step S3010, the method according to embodiments of the disclosure, may, alternatively, further comprise performing an additional adjustment on the different image which has been generated in accordance with embodiments of the disclosure in order to further improve the efficiency with which the subsequent image processing can be performed.

For example, according to embodiments of the disclosure, the method may comprise magnifying the different image of the object to a predetermined size. Consider again the situation described with reference to FIG. 2A of the present disclosure. In this situation, objects, such as players 2014 and 2018, are located at a certain distance from an image capture device 2002. As such, when objects 2014 and 2018 are of equivalent physical size, the object 2014 will appear larger than object 2018 in the image captured by image capture device 2002 because object 2014 is located closer to the image capture device 2002 than object 2018. In other words, object 2018 may appear small in the different image 2024 which is generated in accordance with embodiments of the disclosure.

In this case, it may be difficult to perform the requisite image processing on the different image for object 2018 because of the limited size of object 2018 in the different image 2024 which has been generated. According to embodiments of the disclosure, the method thus further comprises performing a digital zoom on the image of object 2018 in the different image 2024 such that object 2018 and object 2014 are of comparable size in the different image 2024, or such that the image of object 2018 in the different image 2024 reaches a predetermined desired size. It will be appreciated that the level of the digital zoom or magnification which can be applied to the objects in the image of the scene is limited in accordance with the resolution of the image capture device which was used to capture the image.

Alternatively or in addition, the method according to embodiments of the disclosure may comprise performing a resolution adjustment on the different image in order to upscale or downscale the different image to a predetermined resolution. That is, depending upon the processing which is to be applied in step S3008 to the different image, such as the image 2024 described with reference to FIG. 2B, it may be desirable to adjust the resolution of the different image to a predetermined resolution. For example, the image capture devices may capture the image of the object at a resolution higher than is required in order to perform the method according to embodiments of the disclosure. In this case, it may be advantageous to reduce the resolution of the different image to a predetermined resolution, such that the efficiency of the image processing in accordance with embodiments of the disclosure may be further improved. It will be appreciated that any such method for the adjustment of the image resolution may be applied, and the method according to the embodiments of the disclosure is not particularly limited in this respect.

Furthermore, it will be appreciated that the processing which may be applied to the different image prior to step S3008 once the different image has been generated is not particularly limited in this regard, and any such method may be used as required depending upon the situation to which the method according to embodiments of the disclosure is being applied.

As described above, and as illustrated with reference to the situation in FIG. 2B, the different image is smaller than the image of the scene 2000. That is, in this situation, the different image is smaller than the image of the scene at least with regard to image height or image width. However, it will be appreciated that the method according to embodiments of the disclosure is not particularly limited in this respect. That is, the image may be smaller than the image of the scene 2000 in at least one image dimension (such as only with respect to image height or image width).

Alternatively or in addition, the different image of the at least one object may be smaller than the image of the scene in at least one of an image size or an image resolution. That is, the different image may have a memory size smaller than that of the image of the scene. Alternatively, and as described above, the resolution of the different image of the scene may be adjusted to have a resolution lower than that of the image of the scene. Of course, it will be appreciated that the image size and the image resolution of the different image which is generated in accordance with embodiments of the disclosure is not particularly limited, and will vary depending upon factors such as the available computational resources, the desired level of accuracy, and the number of objects which have been located in the scene.

Alternatively or in addition, the different image of the at least one object may have a predetermined aspect ratio. That is, the aspect ratio of the different image may be determined in accordance with the number of object which have been located in the scene, such that for a given number of objects which have been located, the different image, such as image 2024 illustrated with reference to FIG. 2B of the present disclosure, will have a fixed aspect ratio. Fixing the aspect ratio of the different image in accordance with the number of objects which have been located in the image in this manner may further improve the efficiency with which the image processing of step S3008 may be applied to the different image in accordance with embodiments of the disclosure.

Once the different image of the at least one object has been generated, the method proceeds to step S3008.

Detecting a Plurality of Points

As described above, method step S3008 comprises detecting a plurality of points corresponding to parts of the at least one object located in the scene using the different image of the at least one object.

Consider the situation illustrated with reference to FIGS. 2A and 2B of the present disclosure. In this situation, an image of the scene 2000 is captured by at least one of the plurality of image capture devices 2002 to 2012 and, subsequently, the objects in the scene are located. Once the objects have been located a different image of the scene 2024 is generated using the method according to embodiments of the disclosure.

As described above, this different image comprises the objects 2014 and 2018 which were located in the scene 2000, and is smaller than the image of the scene 2000 which was captured by the at least one of the plurality of image capture devices 2002 to 2012. However, in order to determine the detailed information regarding the objects 2014 and 2018, further processing of the different image 2024 is required. That is, at method step S3008, processing is performed on the different image 2024 in order to detect a plurality of points corresponding to parts of the at least one object of the scene.

It will be appreciated that the parts of the object which are detected are not particularly limited, and will vary in accordance with factors such as the type of object which has been located in the image of the scene 2000 or the like.

For example, it will be appreciated that where the at least one object in the image of the scene is a person, then the method comprises identifying the points corresponding to portions of the person in the scene. Consider the situation described with reference to FIG. 2A and 2B. In this situation, the objects in the image of the scene are players 2014 and 2018. In this case, the portions of the person in the scene which are identified correspond to at least one limb of the person (one or more of the player's arms or legs). Alternatively or in addition, the plurality of points could correspond to the player's head, torso, shoulder or the like. Furthermore, it will be appreciated that there may be a plurality of points corresponding to each of these portions of the player. For example, a plurality of points may correspond to the player's leg. An illustration of the plurality of points which have been detected for players 2014 and 2018 is provided in FIG. 2B.

Alternatively, where the object which has been located in the scene is not a person, the plurality of points corresponding to portions of the object may correspond to different features of that object. For example, when the object which has been located in the scene is a ball, the plurality of points which are detected may correspond to different portions of the ball. Furthermore, where the size of the object is small, or the object is particularly uniform in its appearance in the image of the scene, a single point corresponding to the object may be detected.

Furthermore, it will be appreciated that the method which is used in order to detect the plurality of points corresponding to parts of the at least one object of the scene is also not particularly limited, and will vary in accordance with factors including the type of object which has been located in the scene, the computational resources which are available, the image of the scene or the like.

In certain situations, the type of object which is located in the scene may be known in advance. For example, if the image of the scene is an image of a sporting event, such as a football match or the like, then it will be known that the objects which are present in the scene will be objects such as the players, the ball or the like. Alternatively, in certain situations, the type of object may be determined at the stage of locating the objects in the scene. That is, where the objects are located through matching the image of the scene against a plurality of templates, then the type of object which is located in the scene will be known from the template.

Alternatively, in certain situations, the type of object which is present in the scene may be provided to the device 100 by means or user input or the like. Alternatively, in certain situations, where the type of object in the scene is not known even once the location of the objects has been determined, a method of detecting a plurality of points corresponding to parts of the at least one object which is independent of the type of object may be used in accordance with embodiments of the disclosure.

By means of an example, consider again the situation illustrated with reference to FIGS. 2A and 2B of the present disclosure. In this situation, the objects which are located in the image of the scene 2000 are the players 2014 and 2018. In this situation, it is therefore known, once the objects have been located, that the objects 2014 and 2018 correspond to people in the scene. As such, a method of detecting a plurality of points corresponding to parts of the at least one object which is specific to the use on people may be used in accordance with embodiments of the disclosure. For example, when detecting a plurality of points corresponding to parts of a person who has been located in the scene, any method such as key point location, pose estimation or the like may be used in accordance with embodiments of the disclosure. Alternatively or in addition, these methods may comprise the use of computer vision systems or machine learning in order to detect the plurality of points corresponding to parts of the person.

Of course, it will be appreciated that the method according to embodiments of the disclosure is not particularly limited in this respect, and any method for detecting a plurality of points corresponding to parts of the at least one object may be used, provided said method is performed on the different image of the objects of the scene which has been generated in accordance with the present disclosure.

Once the plurality of points corresponding to parts of the at least one object have been detected, the method proceeds to, and ends with, step S3010.

Advantageous Effects

Hence more generally, a method of image processing has been provided in accordance with the method illustrated in FIG. 3 of the present disclosure.

Through the method of image processing according to embodiments of the disclosure, it is possible for detailed features of objects in the scene, such as the pose of a person, to be determined with increased efficiency in a substantially real time environment, since computationally expensive processing is performed on the different image which is generated in accordance with the embodiments of the disclosure.

That is, since the detection of points corresponding to parts of the objects in an image is performed on the different image of the scene, the different image comprising the at least one object which has been identified in the scene and being smaller than the original image of the scene, it is possible to perform the image processing required in order to provide detailed analysis of objects in an image of a scene in substantially real time.

The effects produced by the method according to embodiments of the present disclosure is not limited to these effects, there may be others.

Processing the Detected Points

Figure 4:
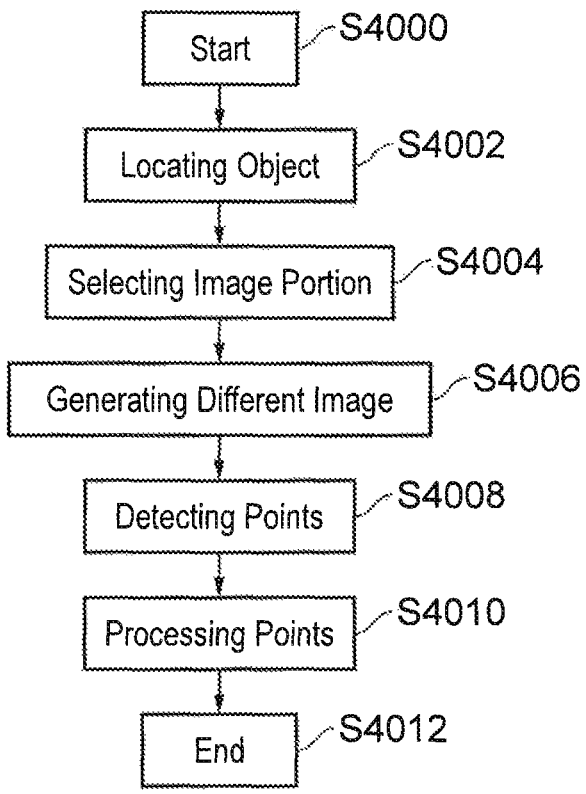
FIG. 4 illustrates a method of image processing according to embodiments of the disclosure.

FIG. 4 illustrates a method of image processing according to embodiments of the disclosure. The method according to embodiments of the disclosure may be performed on the device 100 as according to FIG. 1.

The method steps S4000 to S4008 are substantially the same as method steps S3000 to S3008 described with above with reference to FIG. 3. Accordingly, for brevity, a repetition regarding the details of these method steps will not be included at this stage.

According to the method illustrated with reference to FIG. 4, once the plurality of points corresponding to parts of the at least one object have been detected, the method proceeds to step S4010.

Step S4010 comprises processing the plurality of points which have been determined in step S4008. It will be appreciated that the processing performed on the plurality of points is not particularly limited, and will vary in accordance with the situation to which the method according to embodiments of the disclosure is applied.

For example, in certain situations, it may be desirable to perform additional processing using the plurality of points in order to determine certain properties corresponding to the object located in the scene. Alternatively or in addition, it may be desirable to store the plurality of points corresponding to the object located in the scene in a storage unit for subsequent retrieval. That is, as described above, according to certain embodiments of the disclosure the location of objects in previous images of the scene may be used as a constraint when locating objects in a subsequent image of the scene.

Consider the situation illustrated with reference to FIGS. 2A and 2B of the present disclosure. According to embodiments of the disclosure, once the plurality of points corresponding to objects 2014 and 2018 have been detected (in step S4008) the method may comprise storing an association between the plurality of points and the location of the at least one object in a storage unit. That is, in this example, method step S4010 may comprise storing an association between the plurality of points corresponding to parts of player 2014 with the location of player 2014 in the image of the scene. Furthermore, the method may comprise storing an association between the plurality of points corresponding to parts of player 2018 with the location of player 2018 in the image of the scene. Said association may be stored in the internal storage of device 100 (such as storage unit 104) or may, alternatively or in addition, be stored in an external storage unit accessible to device 100.

In this manner, the location of an object, such as a player, in an image of the scene captured at a given time during the period of image capture, may be stored in association with the plurality of points corresponding to a part or parts of that player. As such, if detailed analysis of the object, such as the player, is required at a time after the image has been captured, said information can be retrieved from the storage without the need to perform further image processing.

Alternatively or in addition, it may be desirable that the different image, such as image 2024 described with reference to FIG. 2B, or the image 2026 (where the plurality of points corresponding to players 2014 and 2018 has been determined) are accessible at a time after the time of image capture. As such, according to embodiments of the disclosure, the method may comprise, at step S4010, generating a resultant image of the plurality of points for each of the at least one object located in the scene (as illustrated with reference to FIG. 2B) and storing an association between the resultant image of the plurality of points and the location of the object in the scene.

Alternatively or in addition, it may be desirable to display the detected plurality of points corresponding to parts of the at least one object in the image of the scene 2000. As such, according to embodiments of the disclosure, method step S4010 may comprise using the plurality of points corresponding to parts of the at least one object and the location of the at least one object in the image of the scene to replace the at least one object in the image of the scene with the corresponding plurality of points.

Figure 5A:
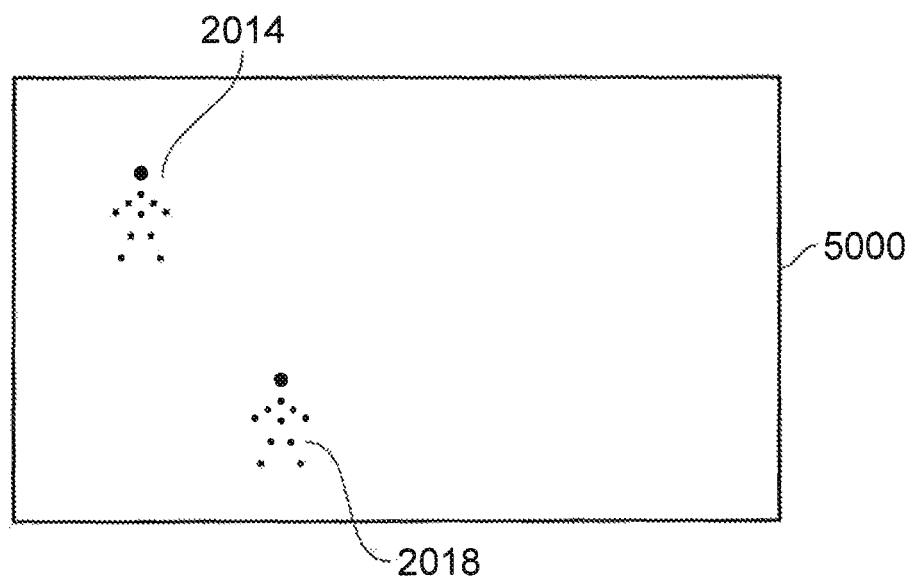
FIG. 5A illustrates a situation to which embodiments of the present disclosure may be applied.

Consider the situation illustrated with reference to FIGS. 2A and 2B of the present disclosure. In this situation, once the plurality of points corresponding to the players 2014 and 2018 have been determined, the location of the players 2014 and 2018 determined in step S4002 may be used in order to generate a new image 5000 of the scene 2000. That is, as is illustrated in the situation of FIG. 5A, a new image of the scene 2000 may be generated where the players 2014 and 2018 have been replaced by the plurality of points detected in step S4008 at their respective locations in the image of the scene. The new image may be stored or displayed by the device 100. Generating a new image 5000 of the scene 2000 in this manner may be advantageous, for example, where subsequent processing is to be performed on the image and knowledge of the respective positions of the objects is required.

Alternatively or in addition, it may be desirable to use the plurality of points to determine properties or characteristics corresponding to the objects which have been located in the image of the scene. Accordingly, in embodiments of the disclosure, method step S4010 may comprise generating a model for the at least one object in accordance with the plurality of points. It will be appreciated that the model which is generated will depend upon certain factors such as the type of object which has been located in the image, and is not particularly limited in this regard.

For example, consider the situation illustrated with reference to FIGS. 2A and 2B of the present disclosure. In this situation, the type of object which has been located corresponds to a person (i.e. players 2014 and 2018). Accordingly, once the plurality of points corresponding to the parts of the person, such as the legs, head, torso or the like, have been detected, the method according to embodiments of the disclosure may comprise generating a model of the player 2014 and a model of the player 2018 in accordance with the plurality of points. For example, the model may comprise forming connections between the parts of the person, such as a connection between the limbs of the person and the torso of the person or the like. In this manner, a more detailed analysis of the pose of the person can be determined.

Furthermore, the method according to embodiments of the disclosure may comprise generating a confidence score for the plurality of points in accordance with a biomechanical analysis of the model of the at least one object. For example, where the object in the image is a person, once a model of the person, such as player 2014 or player 2018, has been determined, the method may comprise performing biomechanical analysis on the model in order to determine whether the plurality of points which have been detected fall within the known range of motion of a person. When the plurality of detected points fall within an expected range, then the confidence level associated with those points may be higher. However, when at least a portion of the plurality of points fall outside an expected range, the confidence level associated with those points may be reduced. In this manner, erroneous determination of the plurality of points can be reduced.

Furthermore, the biomechanical analysis may be used in order to determine the performance of the object, such as the player, the likelihood of injury or the like. That is, from biomechanical analysis of the model generated in accordance with embodiments of the disclosure, it may be determined that the forces experienced by the object, such as player 2014, exceed a certain limit, and that the likelihood of the player 2014 experiencing an injury is increased.

According to embodiments of the disclosure, determining whether the player is likely to, or has indeed experienced, an injury may comprise performing a comparison of results obtained from the biomechanical model with a reference set of data or the like. That is, according to embodiments of the disclosure, a look-up table of parameters (such as posture data, force data or the like) may be stored in a memory such as storage unit 106 described with reference to FIG. 1 of the present disclosure. Accordingly, in this situation, the method according to embodiments of the disclosure may comprise performing a comparison between the data determined from the model and the data in the look-up table. When the parameters obtained from the model fall outside a given range of data stored in the look-up table, it may be determined that the player has, or is likely to, sustain an injury.

The data stored in the look-up table itself may be empirical data obtained over a given time duration through the analysis of previous situations or the like. Alternatively, the data stored in the look-up table may be theoretical data formed based upon the known limits of the parameters. That is, for example, it may be known, in the case of a person, the range of motion of a certain part of the person (such as a limb or the like) may be known. Accordingly, said range of motion may be stored in the look-up or reference table in advance, for comparison with the data obtained from the model.

Of course, it will be appreciated that the type of data which is stored in the look-up table and the manner in which that data is not particularly limited. Rather, said data will vary in accordance with the situation.

Alternatively or in addition, the look-up table of reliable reference data may also be used in order to determine the performance of the player. That is, the location and posture of the object, such as a player, may be compared with reference data stored in the look-up table, in order to determine how well the player is performing in a given sporting event or the like. Again, said data stored in the look-up table may be generated from empirical or theoretical data. Alternatively, or in addition, the performance of the object, such as a player, may be used as an aid to coach the player or improve the player's performance in some manner. For example, the performance data obtained for a player may be reviewed by a coach. This may include the average speed of movement of the player or the amount of distance run by a player over the duration of the game. Alternatively, target data (such as a desired amount of distance to be run) may be entered into the memory in advance by an individual (such as a coach). In this situation, a comparison between the performance data obtained from the model may be used in order to determine how close the player is to achieving a given performance metric or the like. As such, in this situation, the claimed disclosure may be used in order to provide coaching, performance advice, performance statistics or the like to the player.

In fact, since these properties are determined in substantially real time, appropriate action can be taken in response to the determination.

Alternatively or in addition, the method according to embodiments of the disclosure may comprise generating a confidence score for the plurality of points in accordance with a second plurality of points obtained for that object from a second image of the scene; the second image of the scene having a different view of the at least one object in the scene.

Consider the situation illustrated with reference to FIGS. 2A and 2B of the present disclosure. In this case, image capture devices 2002 to 2012 capture an image of the scene 2000 from different positions around the scene. Accordingly, each of the image capture devices 2002 to 2012 capture a different view of the scene 2000. Embodiments of the disclosure may comprise comparing the plurality of points determined using the image from image capture device 2002 with the plurality of points determined using the image captured from at least one of image capture device 2004 to 2012. When it is determined that there is conflict between the plurality of points detected in one view of the scene, and the plurality of points detected from another view of the scene, the level of confidence associated with that plurality of points may be reduced accordingly. In this manner, erroneous determination of the plurality of points can be reduced.

While the above description provides examples of the processing which may be performed once the plurality of points have been detected, it will be appreciated that the present disclosure is not particularly limited in this regard. That is, different processing may be performed in accordance with the situation to which the method according to embodiments of the disclosure is being applied. Moreover, the above processing steps may be performed individually, or in combination, as desired.

Once the processing of the detected points has been performed in step S4010, the method proceeds to, and ends with, step S4012.

Additional Modifications

While the methods according to FIGS. 3 and 4 of the present disclosure have been described with reference to the situation demonstrated in FIGS. 2A and 2B, it will be appreciated that the present disclosure is not particularly limited in this regard. For example, the method may be performed on a plurality of images of a scene, the plurality of images corresponding to a plurality of views of the scene, where a first image of the scene and a second image of the scene having a different view of the at least one object in the scene are obtained from different image capture devices located around the scene.

Alternatively or in addition, the method may be performed on a scene comprising a single object, or may be performed on a scene comprising a plurality of objects. According to embodiments of the disclosure, when the image of the scene comprises a plurality of objects, the method comprises generating the different image of the plurality of objects by generating a single different image of the plurality of objects, the different image comprising the plurality of objects in a predetermined configuration. That is, the plurality of objects may be arranged in a horizontal configuration (as demonstrated in FIG. 2B) or, alternatively, may be arranged in a vertical configuration, a grid based configuration or the like. It will be appreciated that the form of the different image generated according to embodiments of the disclosure is not particularly limited in this regard, provided that the different image comprises the at least one object of the scene and is smaller than the image of the scene.

Furthermore, while the method according to FIG. 3 has been described with reference to a sporting event, such as a football match, it will be appreciated that the present disclosure is not particularly limited in this regard. That is, the method according to embodiments of the disclosure may be applied to images obtained from image capture devices regardless of the content of the images. For example, the method according to embodiments of the disclosure may be advantageously applied to images captured of sporting events other than football matches, such as rugby matches, cricket matches or the like. Alternatively, the method according to embodiments of the disclosure may be applied to images of other scenes comprising at least one object, such as images of a crowd of people.

Feature Identification

As noted above, it is desirable to provide a more efficient method for performing feature identification of objects in an image obtained from a plurality of image capture devices, such that features can be identified in substantially real time. Accordingly, a method of performing feature identification in an image is provided by embodiments of the disclosure.

Figure 5B:
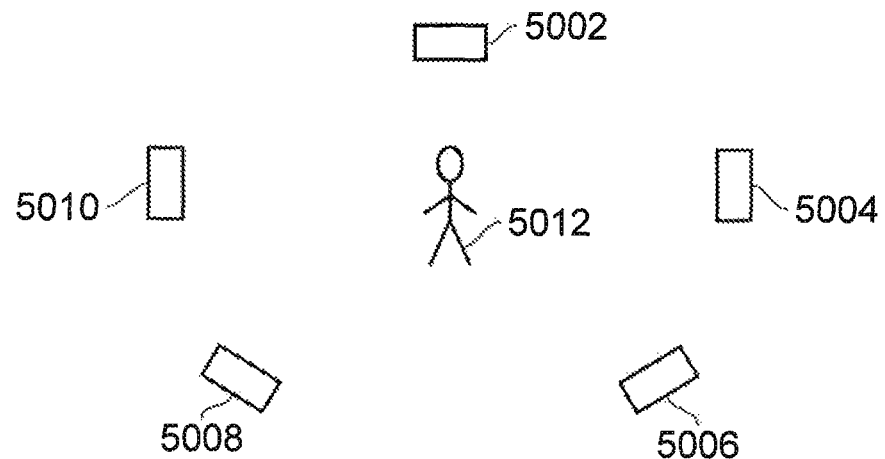
FIG. 5B illustrates a situation to which embodiments of the present disclosure may be applied.

FIG. 5B illustrates a situation to which embodiments of the disclosure may be applied. In this situation, a plurality of image capture devices are provided around a scene. It will be appreciated that both the number and location of the plurality of image capture devices which are provided is not limited to that illustrated in this situation. Rather, provided the image capture devices can capture images comprising a plurality of views of the object 5012, the number and configuration of image capture devices is not particularly limited. As described with reference to FIG. 2A of the present disclosure, the form of the image capture devices themselves is also not particularly limited. In fact, any type of image capture device may be used in accordance with embodiments of the disclosure. For example, the image capture device may capture high resolution images of the scene, 4K images of the scene or the like.

Accordingly, in this situation, the image capture devices capture images comprising a plurality of views of the object 5012.

In this situation, the object 5012 comprises a person, such as a player, who is engaged in a sporting activity such as a football match or the like. However, it will be appreciated that the present disclosure is not particularly limited in this respect. That is, the object may be any other type of object, such as a ball or the like. Moreover, the present disclosure is not limited to a sporting activity, and may be applied to any other scene or environment such as a shopping mall, an airport or the like.

Once the images of the object have been obtained, these images are provided to a device 100, such as described with reference to FIG. 1 of the present disclosure.

According to embodiments of the disclosure, a plurality of points corresponding to parts of the object 5012 are obtained from a plurality of images corresponding to a plurality of views of the object 5012. That is, in this situation, a plurality of points corresponding to parts of the object 5012 may be obtained from an image captured by image capture device 5002 and a plurality of points corresponding to parts of the object 5012 may be obtained from an image captured from a different image capture device such as image capture device 5006 or the like. In other words, the plurality of points are obtained from images corresponding to a plurality of views of the object 5012.

Furthermore, according to embodiments of the disclosure, once the plurality of points have been obtained a three-dimensional model of the object 5012 is generated. That is, since the plurality of points have been obtained from images corresponding to a plurality of views of the object 5012, it is possible to generate a three-dimensional model of the object 5012. In other words, while the image captured from a single image capture device comprises a single two-dimensional view of the object 5012, the model generated in accordance with embodiments of the disclosure is a three-dimensional model which may be manipulated in a three-dimensional environment.

Once the three-dimensional model of the object 5012 has been generated, a portion of that model is selected, in three-dimensional space, as a region which can be used to identify the object. In this situation, the object 5012 is a person who is engaged in a sporting activity such as football. Accordingly, the three-dimensional mode is a three-dimensional model of that person. A portion of the three-dimensional model is then selected, such as the rear of the players torso, the player's face or the like, as a portion which can be used in order to identify the person. As an example, in the situation of a sporting activity, such as football or the like, the portion selected could correspond to the expected location of an identifying feature, such as a player number, on the three-dimensional model of the person 5012.

Once portion of the three-dimensional model has been selected, the method according to embodiments of the disclosure comprises mapping the selected location on the three-dimensional model to at least a portion of at least one of the images captured by the image capture devices 5002 to 5010.

Consider, for example, that the selected portion of the three-dimensional model corresponds to the rear of the person's torso (where an identifying feature, such as a player number, is expected to be located). In this situation, the method comprises mapping the selected portion of the three-dimensional model to the plurality of images of the person 5012. That is, it can be determined from the three-dimensional model, that image capture device 5002 will have captured an image of the rear of the torso of person 5012, corresponding to the selected portion of the three-dimensional model. In contrast, it can be determined, from the three-dimensional model, that image capture devices 5008 and 5006 have captured images corresponding to the front of the person 5012, and will not have captured images corresponding to the rear of the torso of the person 5012 (corresponding to the selected portion of the three-dimensional model).

Furthermore, from the three-dimensional model, it can be determined which region of the image captured by the image capture device 5002 corresponds to the selected portion of the three-dimensional model.

That is, while the image capture device 5002 has captured an image corresponding to the selected portion of the three-dimensional model, the image captured by the image capture device 5002 will contain a portion of the scene (such as part of the pitch and the like) which does not correspond to the selected portion of the three-dimensional model. As such, the method comprises selecting a portion of the image captured by image capture device 5002 as the region in which the portion of the player 5012 corresponding to the selected portion of the three-dimensional model is located.

Finally, once this region of the image captured by image capture device 5002 has been selected, the method comprises performing feature identification on the selected region of the selected image. In this situation, since the selected region is the region where an identifying feature, such as a player number, is located, the method of feature identification comprises performing number recognition processing on the image in order to identify the player number worn by the player 5012.

As such, in this situation, the player 5012 who is present in the image of the scene can be identified as the player who is wearing the identified player number.

Since the feature identification is performed only on a selected portion of the selected plurality of images captured by the image capture devices corresponding to the selected portion of the three-dimensional model, the efficiency of the feature identification can be improved. That is, since computationally expensive feature identification processing is not performed directly on the images obtained from the plurality of cameras, the size and number of images which must be analysed in order to identify a feature in the images is reduced.

Moreover, since the region analysed for feature identification is limited to a region where the identifying feature is likely to be determined (such as the rear of the player's torso in this situation) then the accuracy of the feature identification can be improved through a reduction in erroneous identification. That is, since feature identification will not be performed on a region of the images where it is known that the feature is not located (such as the pitch or the front of the player 5012) instances of erroneous feature identification can be reduced.

In this manner, according to embodiments of the disclosure, it is possible to efficiently and accurately perform the image processing required in order to identify features in a plurality of images of a scene, such that the detailed feature identification can be provided substantially in real time.

Method of Feature Identification in an Image

Figure 6:
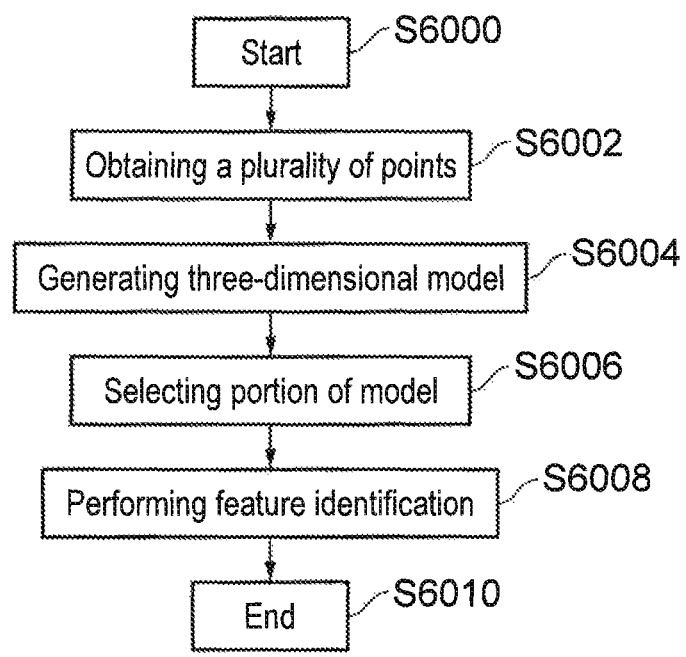
FIG. 6 illustrates a method of feature identification in an image according to embodiments of the disclosure.

FIG. 6 illustrates a method of feature identification in an image according to embodiments of the disclosure. The method according to embodiments of the disclosure may be performed on the device 100 as according to FIG. 1.

In accordance with embodiments of the disclosure, the method starts at step S6000, and progress to step S6002. Step S6002 comprises obtaining a plurality of points corresponding to parts of an object from a plurality of images of the object, the plurality of images corresponding to a plurality of different views of the object in a scene. Step S6004 comprises generating at least one three-dimensional model of the object in accordance with the plurality of points corresponding to parts of the object obtained from a plurality of different views. Step S6006 comprises selecting at least a portion of the at least one three-dimensional model of the object as a region of interest. Step S6008 performing feature identification on a portion of at least one of the plurality of images corresponding to the region of interest. Finally, the method ends with step S6010.

The method steps S6002 to S6008 are described in detail below, with reference to the situation illustrated in FIG. 5B.

Obtaining a Plurality of Points

As described above, the method step S6002 comprises obtaining a plurality of points corresponding to parts of an object from a plurality of images of the object, the plurality of image corresponding to a plurality of different views of the object in the scene.

It will be appreciated that the method of obtaining the plurality of points corresponding to parts of an object from the plurality of images is not particularly limited, and will vary in accordance with the situation. For example, the method used may vary in accordance with the number of image capture devices, the images of the scene, the type of object in the scene, the number of objects in the scene or the like.

For example, it will be appreciated that where the at least one object in the image of the scene is a person, then the method comprises identifying the points corresponding to portions of the person in the scene. Consider the situation described with reference to FIG. 5B for example. In this situation, the object in the image of the scene is a player 5012. In this case, the portions of the person in the scene which are identified correspond to at least one limb of the person (one or more of the player's arms or legs). Alternatively or in addition, the plurality of points could correspond to the player's head, torso, shoulder or the like. Furthermore, it will be appreciated that there may be a plurality of points corresponding to each of these portions of the player. For example, a plurality of points may correspond to the player's leg.

Alternatively, where the object in the scene is not a person, the plurality of points corresponding to portions of the object may correspond to different features of the object. For example, when the object in the scene is a ball, the plurality of points which are detected may correspond to different portions of the ball. Furthermore, where the size of the object is small, or the object is particularly uniform in its appearance in the image of the scene, a single point corresponding to the object may be detected.

Consider again the situation illustrated with reference to FIG. 5B of the present disclosure. In this situation, the object which is imaged by the plurality of image capture devices 5002 to 5010 is a person 5012. As such, a method of detecting a plurality of points corresponding to parts of the at least one object which is specific to the use on people may be used in accordance with embodiments of the disclosure. For example, when detecting a plurality of points corresponding to parts of a person who has been located in the scene, any method such as key point location, pose estimation or the like may be used in accordance with embodiments of the disclosure. Alternatively or in addition, these methods may comprise the use of computer vision systems or machine learning in order to detect the plurality of points corresponding to parts of the person.

Furthermore, it will be appreciated that, in certain examples, the plurality of points corresponding to parts of an object may be detected as part of the method step S6002 illustrated in FIG. 6. However, in other examples which fall within the embodiments of the disclosure, the plurality of points corresponding to parts of an object may be obtained from a storage unit (such as the storage unit 104 of device 100 illustrated with reference to FIG. 1). That is, the plurality of points may be determined in advance for each of the plurality of images from the plurality of image capture devices, and subsequently retrieved from the storage unit in accordance with method step S6002. The plurality of points may then be used to perform feature identification in accordance with the embodiments of the disclosure.

Of course, it will be appreciated that the method according to embodiments of the disclosure is not particularly limited in this respect, and any suitable method for obtaining a plurality of points corresponding to parts of an object may be used, provided said method is performed such that the plurality of points are obtained from a plurality of images, the plurality of images corresponding to different views of the object in the scene.

Once the plurality of points corresponding to parts of an object have been obtained, the method proceeds to method step S6004.

Generating a Three-dimensional Model

Method step S6004 comprises generating at least one three-dimensional model of the object in accordance with the plurality of points corresponding to parts of the object obtained from a plurality of different views.

As described above, with reference to the situation illustrated in FIG. 5B of the present disclosure for example, the plurality of points corresponding to parts of the object are obtained from a plurality of images of the object, those images corresponding to a plurality of views of the object. As such, the plurality of points comprise information regarding the object obtained from a plurality of views of the object. Accordingly, the plurality of points can be used in order to generate a three-dimensional model of the object.

Of course, it will be appreciated that the method of generating the three-dimensional model in accordance with embodiments of the disclosure is not particularly limited. That is, the method will vary in accordance with factors such as the number of points obtained, the number of views from which those points have been obtained, the type of object to which the plurality of points correspond or the like.

In the situation described with reference to FIG. 5B, the object imaged by the plurality of image capture devices corresponds to a person 5012. As such, the method used to create the three-dimensional model may be a method suited to the generation of a three-dimensional model of a person.

In certain embodiments of the disclosure, the method of generating the three-dimensional model may comprise generating a two-dimensional model of the object in accordance with the plurality of points for each of the plurality of views of the object, and subsequently generating the at least one three-dimensional model of the object through triangulation of the plurality of two-dimensional models of the object.

In the situation described with reference to FIG. 5B, the image from image capture device 5002 may be used to obtain a first plurality of points corresponding to parts of object 5012. Furthermore, the image from image capture device 5008 may be used to obtain a second plurality of points corresponding to parts of the object 5012. In this manner, the first plurality of points from the first image capture device provide a first view of the object 5012 and the second plurality of points obtained from the second image capture device provide a second view of the object 5012.

A two-dimensional model of the object 5012 may then be obtained from the plurality of points for each of the first and second plurality of points respectively. That is, in this situation, a first two-dimensional model may be obtained based on the first plurality of points, while a second two-dimensional model may be obtained based on the second plurality of points. It will be appreciated that the method of generating the two-dimensional model from the plurality of points is not particularly limited, and will vary in accordance with the situation.

For example, in the situation illustrated with reference to FIG. 5B (where the object is a person), once the plurality of points corresponding to the parts of the person, such as the legs, head, torso or the like, have been detected, the method according to embodiments of the disclosure may comprise generating a model of the person 5012 by forming connections between the parts of the person, such as a connection between the limbs of the person and the torso of the person or the like. Of course, the present disclosure is not particularly limited in this respect, and any suitable method may be used.

Once the first two-dimensional model has been created for the first plurality of points and the second two-dimensional model has been created for the second plurality of points, a resultant three-dimensional model of the person 5012 may be created by triangulating the first and second two-dimensional model. That is, using the first and second two-dimensional model, with knowledge of the respective locations of image capture device 5002 and 5006, a resultant three-dimensional model of the object can be generated.

Alternatively, in certain embodiments of the disclosure, the method of generating the three-dimensional model may comprise generating the at least one three-dimensional model comprises constructing the at least one three-dimensional model of the object by processing the plurality of points in a three-dimensional environment.

That is, in contrast to the situation whereby the plurality of two-dimensional models are created in two-dimensional space and whereby the three-dimensional model is generated through a triangulation of the plurality of two-dimensional models, according to embodiments of the disclosure, the three-dimensional model may be generated directly from the plurality of points obtained from the first and the second camera respectively.

In particular, processing the plurality of points of the object obtained from a plurality of views in this manner enables connections to be made between the plurality of points which would not be possible in two-dimensions. That is, certain portions of the object may be concealed or otherwise rendered not visible in the view of the object obtained from a particular image capture device (such as image capture device 5006). Nevertheless, by generating the three-dimensional model directly from the plurality of points, all those points which can be seen in a respective view will contribute to the generation of the three-dimensional model of the object, even if there are not enough visible points in that view to construct a full independent two-dimensional model.

As such, generating the three-dimensional model directly from the plurality of points in this manner may increase the volume of data points corresponding to the three-dimensional model, and may thus further improve the accuracy with which the three-dimensional model of the object can be determined.

Of course it will be appreciated that while the above methods of generating the three-dimensional model of the object are described with reference to a single object 5012, the present disclosure is not intended to be particularly limited in this regard. That is, the method according to embodiments of the disclosure may comprise generating a separate three-dimensional model for each object which is located in the images obtained from the plurality of image capture devices.

In particular, when a plurality of objects are imaged by the plurality of image capture devices, the method according to embodiments of the disclosure may comprise generating at least one three-dimensional model of each object. That is, the plurality of points corresponding to each object from each of the images of that object are used in order to generate the three-dimensional model of that object for each of the objects which are present in the scene respectively. In fact, since the images of the objects are obtained from a plurality of views, even when two or more objects overlap in a single view (such as that obtained from image capture device 5002) said objects may be distinguished owing to the plurality of points obtained for those objects from at least one other view of the scene (such as those images obtained from image capture devices 5004 to 5010 for example). As such, separate three-dimensional models for each object can be created even when the objects overlap or collide in one or more views of the scene.

Furthermore, it will be appreciated that while the above method is described with reference to only two views of the object 5012, the present disclosure is not particularly limited in this respect, and a greater number of views may be used to generate the three-dimensional model in accordance with embodiments of the disclosure. In fact, it will be appreciated that the accuracy of the three-dimensional model which is generated in accordance with embodiments of the disclosure may increase as the number of views of the object increases.

Furthermore, it will be appreciated that the present disclosure is not particularly limited to the production of a single three-dimensional model for each object in the image. Rather, it may be advantageous to create a first three-dimensional model from a plurality of first views of the object and a second three-dimensional model from a second plurality of views of the object. In fact, the number of three-dimensional models generated for an object may be determined in accordance with the situation.

Once the at least one three-dimensional model has been generated, the method proceeds to method step S6006.

Selecting a Portion of the Three-dimensional Model

As described above, the method step S6006 comprises selecting at least a portion of the at least one three-dimensional model of the object as a region of interest.

Figure 7:
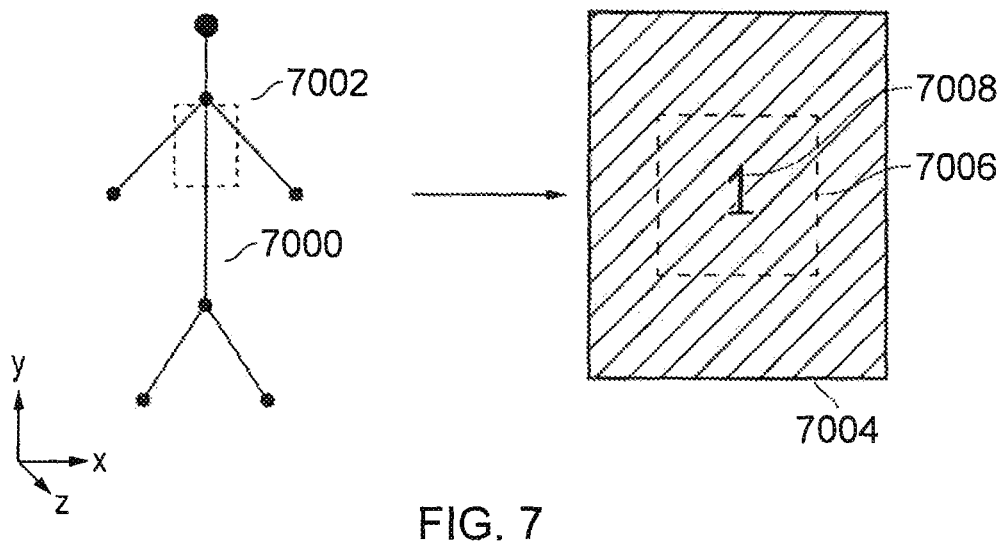
FIG. 7 shows an illustration of selecting a portion of the three-dimensional model in accordance with embodiments of the disclosure.

FIG. 7 shows an illustration of selecting a portion of the three-dimensional model in accordance with embodiments of the disclosure. In this situation, a three dimensional model 7000 has been generated in accordance with embodiments of the disclosure. That is, while a two-dimensional projection of the model 7000 is illustrated in FIG. 7, it will be appreciated that the model 7000 itself is a three-dimensional model. As such, model 7000 can be manipulated in three-dimensional space. Accordingly, as illustrated in FIG. 7, the model is rotatable or translatable about three axes (illustrated as x, y and z in the three-dimensional space).

According to embodiments of the disclosure, a region of the three-dimensional model 7000 is selectable as a region of interest. That is, a selection of at least a portion of the model can be selected as a target region, or a region to which the feature identification processing as according to embodiments of the disclosure will subsequently be applied. In the situation illustrated with reference to FIG. 7, the region of interest has been selected and is illustrated as region 7002. That is, in this example, the region of interest corresponds to a region of the rear of the torso of the three dimensional model 7000.

Of course, it will be appreciated that the region of interest 7002 is not particularly limited in this respect, and any such region of the three-dimensional model 7000 may be selected as the region of interest. For example, a portion of the front of the three-dimensional 7000 may be selected, a portion of the face of the three-dimensional model 7000 or combinations thereof may be selected as the region of interest in accordance with embodiments of the disclosure. That is, while a single region of interest is selected in these situations, multiple regions of interest may be selected if desired. The size and dimensions of the region of interest are also not particularly limited in this regard.

Moreover, while in this situation, the three-dimensional model is a three-dimensional model 7000 of a person, it will be appreciated, as described above, that the claimed disclosure is not particularly limited in this respect. For example, the three-dimensional model may be a model of any object, such as a car, a building or the like, provided that the model has been generated in accordance with embodiments of the disclosure. Regardless of the form of the three-dimensional model, the region of interest is selectable as the target region for which the subsequent feature identification processing will be performed.

It will be appreciated that the method of selecting the region of interest is not particularly limited, and will vary in accordance with the situation to which the method according to embodiments of the disclosure is applied.

For example, in certain situations, the region of interest may be selected manually be a user. That is, a user could provide a form of user input to the device 100 through the user input unit 106 as described with reference to FIG. 1 of the present disclosure. This input could be provided on a model by model basis by the user, or alternatively, a region may be indicated as a region which should be selected (such as the face of model 7000, for example) and then this selection could be used in order to automatically select the region of interest for all subsequent models, until further user input has been provided. That is, in this specific example, the region corresponding to the face of the three-dimensional model would be selected for all subsequent models until the user provides further input to change the default selection.

Alternatively or in addition, the region of interest may comprise automatically selecting a region of interest in accordance with an expected location of a feature which is to be used in order to identify the object. For example, when the form of the model has been identified (such as a person, a car or the like) the method may comprise automatically selecting a region of that model where it is known that a feature is typically located which could be used in order to perform feature identification.

In the specific example of a car, it may be known that the number plate is usually located on the front and rear portions of the car, so these regions of the three-dimensional model may be automatically selected in accordance with embodiments of the disclosure. Alternatively, in the specific example of a person, it may be known that the face of a person may often be used in order to identify that person. As such, the region of the three-dimensional model corresponding to the user's face may be automatically selected. Further alternatively, in the specific example of a sporting event, such as a football match or the like, it may be known that a person will have a certain identifying feature on their back (such as a player number or the like) which can be used in order to identify the person. Accordingly, in this example, the corresponding region where the identifying feature is expected to be located may be automatically selected in accordance with embodiments of the disclosure.

Of course, the present disclosure is not limited to these specific examples, and the method according to embodiments of the disclosure may be applied to any such three-dimensional model which has been generated in accordance with method step S6006.

Once the region of interest has been selected, the method proceeds to method step S6008.

Performing Feature Identification

As described above, the method step S6008 comprises performing feature identification on a portion of at least one of the plurality of images corresponding to the region of interest.

Consider again the situation illustrated with reference to FIG. 7 of the present disclosure. In this specific example, a region 7002 of the three-dimensional model 7000 has been selected as the region of interest in accordance with method step S6006 described above. As such, the method according to embodiments of the disclosure comprises performing feature identification on a portion of at least one of the plurality of images corresponding to the region of interest 7002 which has been selected.

As described above, the three-dimensional model, such as model 7000, is generated in accordance with a plurality of points corresponding to parts of the object, where the plurality of points are obtained from the plurality of images comprising different views of the object in a scene. Accordingly, once the region of the three-dimensional model has been selected, it is possible to identify the at least one image (and the portion of that at least one image) which corresponds to the selected region of interest.

That is, once the region of interest has been selected the method according to embodiments of the disclosure comprises first determining the at least one image which has captured a view corresponding to the selected portion of the three-dimensional model. Subsequently, a portion of that at least one image may be determined as a portion containing the region corresponding to the selected portion of the three-dimensional model. In this manner, at least a portion of the at least one of the plurality of images of the object corresponding to the region of interest can be determined as the region upon which to perform feature identification in accordance with the embodiments of the disclosure.

That is, in the situation illustrated in FIG. 7, a single image of the scene 7004 is selected as corresponding to the selected portion of the three-dimensional model 7000 (i.e. the region of interest). Of that image 7004, a portion 7006 is selected as a portion where the identifying feature 7008 is expected to be located. Accordingly, feature identification is performed of the identifying feature 7008 is performed on the portion 7006 of image 7004.

In the situation illustrated with reference to FIG. 7, the identifying feature 7008 in the image portion 7006 of image 7004 is a number; this may be the case in a certain situations such as a sporting event for example. Players engaged in sporting events, such as football matches or the like, often wear a specific shirt indicating the team to which they belong. That is, the colour or style of the shirt may indicate the team to which the player belongs. Moreover, individual players within the team may wear a specific number indicating their position within the team. Accordingly, the combination of identification of the team shirt and identification of the player number may uniquely identify each player on the pitch. That is, while the number may uniquely identify each player in the team, in some circumstances, the numbering may be repeated for players on an opposing team. Accordingly, it is necessary to identify both the team colour and the number worn by the player in order to provide feature identification in a situation such as this.

Consider the specific situation illustrated with reference to FIG. 5B. If the region of interest of a three-dimensional model of 5012 is selected to be the region corresponding to the face of object 5012, then the images from the plurality of cameras 5002 to 5010 which have obtained an image of the face of object 5012 will be determined as the images on which to perform feature identification. The images from cameras which have not obtained an image of the face of the user, and thus have not provided any of the points used to construct that region of the three-dimensional model, will thus not be determined as images on which to perform feature identification in this case. Furthermore, once the images have been selected, only those regions of the image corresponding to the location of the object in the image will be determined as the region on which to perform feature identification.

It will be appreciated that any number of portions may be determined as the portions on which to perform feature identification, and that the method according to embodiments of the disclosure is not particularly limited in this respect. That is, for example, the number of portions will depend on the number of regions of interest which have been selected, the number of image capture devices which have captured an image of the region of interest, the number of objects in the image or the like.

Furthermore, it will be appreciated that when two or more portions have been selected, the method according to embodiments of the disclosure may comprise performing feature identification on the individual regions, with the results of the feature identification being used in order to determine the confidence of the feature identification. In other words, the method may comprise performing image processing on the portion of each image and combining, or otherwise processing, the results in order to obtain a confidence level for the identified feature. Alternatively, the portions of the image may be combined and the feature identification may be performed on the resultant image.

Furthermore, as described above, there may be a plurality of objects captured by the image capture devices. In this case, the feature identification is performed separately for each of the plurality of objects based on their respective selected region of interest.

It will be appreciated that the method of performing feature identification on the determined portions of the image is not particularly limited. For example, the feature could be identified in using at least one of machine learning, template matching or the like. In the case of machine learning or computer vision systems, the method may comprise training the feature identification on a set of features which are to be identified in the target images. Alternatively, templates of the feature, or a set of features, may be stored in memory (such as storage unit 106 of device 100 described with reference to FIG. 1). Of course, any such method may be used depending upon the situation to which the embodiments of the disclosure are applied.

In certain embodiments of the disclosure, prior to performing the feature identification, the method may comprises generating a different image portion having a predetermined image characteristic for each portion of the at least one of the plurality of images corresponding to the region of interest and identifying the image feature in each of the different image portions.

In other words, once the image portion or portions corresponding to the region of interest have been determined, the method may comprise performing additional image processing on the image portions prior to performing the feature identification.

In certain embodiments, the predetermined image characteristic is at least one of a predetermined image perspective, colour balance, contrast level, resolution or image size or the like. Of course, other image characteristics could be standardised prior to performing the image feature identification in accordance with embodiments of the disclosure.

By performing the additional image processing in this manner prior to performing the feature identification, it is possible to perform the feature identification on a portion of the image having a predetermined image characteristic, which can improve the accuracy and efficiency of the feature identification.

In certain situations, the method according to embodiments of the disclosure may comprise using information regarding the objects which are expected to be located in the scene in order to further improve the speed and efficiency of feature identification. For example, in a sporting event such as a football match, a rugby match or the like, the number of players who will be engaged in the match will be known in advance. Moreover, in such situations, the identifying features (such as the list of player numbers) will also be known in advance. Information regarding the number or players or expected identifying features may be stored in a memory (such as storage 106, as described with reference to FIG. 1 of the present disclosure).

In these situations, the method may comprise loading the target information from the storage prior to performing feature identification. Accordingly, when identifying features in a scene, the method may comprise comparing the selected portion or portions of the plurality of images against the target information. Providing a targeted list of features in this manner further improve the speed and efficiency of feature identification. That is, since in these situations, the feature identification only needs to decide which of the target features are located in the selected portion or portions of the image, the speed and efficiency of the feature identification processing can be further improved.

Consider a situation such as a football match or the like. In this situation, two separate teams of players may be engaged in the football match. Prior to the match, information regarding the teams may be stored in the storage. For example, the fact that the first team will play in red and the second team will play in blue may be stored in the storage unit. Accordingly, in order to determine which team a given player is playing for, the feature identification processing must only decide whether the selected portion of the image corresponding to the region of interest is red or blue. The full spectrum of other potential colours does not need to be considered in this case. In fact, since the feature identification processing must merely discriminate between the two types of colour in a situation such as this, the accuracy of the feature identification can also be improved.

Alternatively or in addition, in a situation where target information regarding a number of target objects is stored in the memory, the identification of a feature corresponding to one of those objects in the selected portion or portion of the plurality of images corresponding to the region of interest, may be used to further improve the identification of the other objects in that series of images.

In a situation such as a football match, for example, it will be known in advance that in a plurality of images captured a given instance of time, only one player with a given player number for a given team will be located in the scene. That is, the combination of team colour and player number is unique to each player. Accordingly, once that unique combination of team colour and player number is located in one portion of the image, it will be known that said unique combination will not be found in another portion of the same series of images (captured at the same instance of time).

The method by which this information is used in accordance with embodiments of the disclosure is not particularly limited. For example, in certain situations, once a given target feature has been identified in one portion of a series of images, said target feature may be removed from the list of remaining target features when performing feature identification for the remaining features in that series of images. In other words, the remaining list of target features is iteratively reduced for a given instance of time as those features are identified in that series of images. Of course, in a subsequent series of images (captured by the image capture devices at a later instance of time) the full list of target features may be restored. This further improves the speed and efficiency of feature identification.

Alternatively or in addition, the full list of target information may be maintained for each series of images. In this situation, the list of target information may be used in order to improve the accuracy of feature identification and reduce instances of erroneous identification. For example, in situations such as a football match, if the unique combination of player number and team colour is found in multiple portions of the same series of images (captured by the image capture devices at the same instance of time) then it may be determined that erroneous identification has occurred since each individual player can only be located in a single location in the scene at a given instance of time. In this case, further processing may be performed in order to rectify the erroneous identification.

Moreover, in a situation such as a football match or the like, the number of features which have been identified could be used in order to verify the number of players on the pitch for a given team. That is, if more than a set number of players are identified in a certain team colour, it can be determined that an erroneous identification may have occurred (or that the number of players per team exceeds a predetermined allowable limit).

According to certain embodiments of the disclosure, the use of the target information may therefore be used in order to improve the accuracy, speed and efficiency of the feature identification processing.

Of course, it will be appreciated that use of the target features according to certain embodiments of the disclosure is not particularly limited to these examples. Rather, the type of target information which is stored, and its subsequent use during the feature identification processing, may vary in accordance with the situation.

Once the feature has been identified, the method proceeds to, and ends with, method step S6010.

Advantageous Effects

Hence more generally, a method of feature identification in an image has been provided in accordance with the method illustrated in FIG. 6 of the present disclosure.

According to the above described embodiments of the disclosure, it is possible to more efficiently perform feature identification of objects in an image obtained from a plurality of image capture devices in substantially real time.

That is, by obtaining the plurality of points, generating the three-dimensional model and selecting the regions of interest in accordance with embodiments of the disclosure, an appropriate region of the plurality of images comprising a plurality of views of the target object can be selected as the region on which to perform feature identification. Since the computational expensive process of feature identification processing is not performed directly on the images obtained from the plurality of cameras, the speed and accuracy of the feature identification can be improved.

The effects produced by the method according to embodiments of the present disclosure is not limited to these effects, there may be others.

Identification of Object

Figure 8:
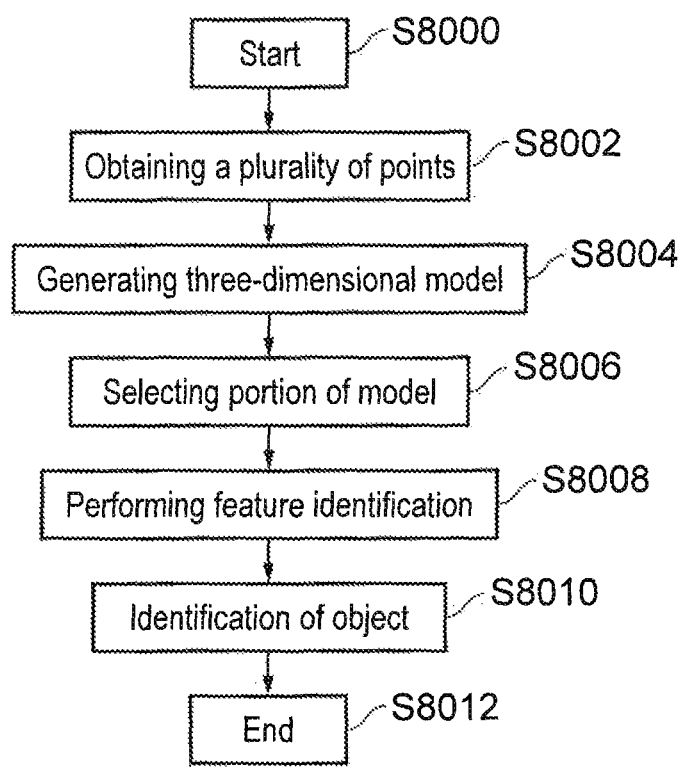
FIG. 8 illustrates a method of image processing according to embodiments of the disclosure.

FIG. 8 illustrates a method of image processing according to embodiments of the disclosure. The method according to embodiments of the disclosure may be performed on the device 100 as according to FIG. 1.

The method steps S8000 to S8008 are substantially the same as method steps S6000 to S6008 described with above with reference to FIG. 6. Accordingly, for brevity, a repetition regarding the details of these method steps will not be included at this stage.

According to the method illustrated with reference to FIG. 8, once the feature identification has been performed, the method proceeds to step S8010. Step S8010 comprises performing additional processing using the identified feature, such as the identification of the object itself in the image.

For example, in embodiments of the disclosure, method step S8010 comprises using the result of the feature identification to identify the object in at least one of the plurality of images of the scene, or to identify the at least one three-dimensional model. Consider the example illustrated with reference to FIG. 5B. In this situation, the region of interest is a region corresponding to the face of the player 5012, who is engaged in a sporting activity such as football or the like. Accordingly, the feature identification processing is performed on at least a portion of at least one of the plurality of images corresponding to region of interest. That is, feature identification is performed on a portion of the image or images corresponding to the player's face. As such, once the face of the player 5012 has been identified, the result of the identification can be used in order to identify the object 5012. That is, since the face of the object 5012 has been identified as a face belonging to a specific player, it can be determined, for all images of the object 5012, that the object 5012 is the player who has been identified, regardless of whether or not the face of the object is present in a given image. That is, for example, once the face of the player 5012 has been identified in the image captured by image capture device 5002, the player can be identified in the images captured by image capture devices 5005 to 5010 regardless of whether the face of the player 5012 is present in those images or not. Moreover, the three-dimensional model can be identified as the three-dimensional model corresponding to that player.

Alternatively or in addition, the method according to embodiments of the disclosure may comprise generating an association between the object and a feature identified in at least one of the plurality of images of the scene and using the association in order to identify the object in at least one other image of the plurality of images of the scene. That is, for example, once a feature, such as a player number or the like has been identified in an image, an association between that feature and the object 5012 may be generated. Accordingly, in any subsequent image where the image feature such as the player number is identified, the object associated with that player number can also be identified.

In other words, according to embodiments of the disclosure, the identification of features in at least one of the plurality of images (such as the image captured by image capture device 5002) can be used to identify and discriminate between the objects in that image, but can also be used to identify and discriminate between the objects as present in the plurality of images captured of that object by other image capture devices (such as image capture devices 5004 to 5010), whether the identifying feature or features are present in those images or not.

Of course, once the object has been identified in the image, a number of further processing steps may be performed in accordance with the situation to which embodiments of the disclosure are applied.

Consider, for example, the situation whereby the object in a plurality of images is a person, and that person is engaged in a sporting activity such as a football match or the like. According to embodiments of the disclosure, the identified players who are engaged in the football match can be rapidly identified using the plurality of images which have been captured of the scene. Accordingly, once the players have been uniquely identified, it is possible to perform additional processing on the plurality of image or the three-dimensional model in order to determine unique properties and characteristics related to the individual players.

For example, where the object in the plurality of images is a person, the method may comprise determining, from the three-dimensional model of that person, the characteristic of the person such as a classification of the person, a body shape of the person, a pose of the person, a performance indicator corresponding to the person or a current status of the person or the like.

In the situation illustrated with reference to FIG. 5B, where the object is a person who is engaged in a sporting event such as a football match or the like, the classification of the person could be a classification of the team the person is playing for, the type of positon held by the person or the like. Furthermore, a performance indicator corresponding to the person could be determined from the positon of the identified person with respect to the other identified objects or people, such as the proximity of the player to an object such as a ball in the plurality of images.

That is, once the players have been identified, as according to embodiments of the disclosure, subsequent analysis of the three-dimensional model and the plurality of images could be used in order to provide a unique condition or status of the each of the players respectively.

Consider the situation illustrated with reference to FIG. 5B. Once player 5012 has been identified, further analysis of the model or images corresponding to that player could be performed in order to determine a unique status or condition of the player 5012 in the plurality of images. For example, an analysis of the three-dimensional model or plurality of images may provide indication of whether the player 5012 is tired, exhausted, has been concussed or the like. In the case of concussion, for example, an analysis of the three-dimensional model may indicate that the player is moving or has a posture representative of a person who has experienced concussion. That is, the analysis of the three-dimensional model may, in accordance with embodiments of the disclosure, comprise a comparison of the three-dimensional model with a representative library of data stored in the memory in order to determine the condition of the player. Alternatively, analysis of the identified object with respect to other objects which have been identified in the image (such as the player 5012, other players and a ball) may provide an indication as to whether the player 5012 has violated a rule of the football match, such as playing the ball while being offside or just being in an offside position, for example.

Alternatively or in addition, using the at least one three-dimensional model of the identified person to determine a characteristic of the person from the plurality of images may comprise performing a biomechanical analysis on the at least one three-dimensional model of the identified person. That is, from biomechanical analysis of the model generated in accordance with embodiments of the disclosure, it may be determined that the forces experienced by the object, such as player 5012, exceed a certain limit, and that the likelihood of the player 5012 experiencing an injury is increased.

Of course, while the above have been described with reference to a sporting event or the like, such as a football match or the like, it will be appreciated that the present disclosure is not particularly limited in this respect. That is, once the objects have been identified in the plurality of images in accordance with embodiments of the disclosure, any such analysis may be performed on the objects as required, in accordance with the situation to which the method according to embodiments of the disclosure is applied.

Storage of Feature Identification Results

Figure 9:
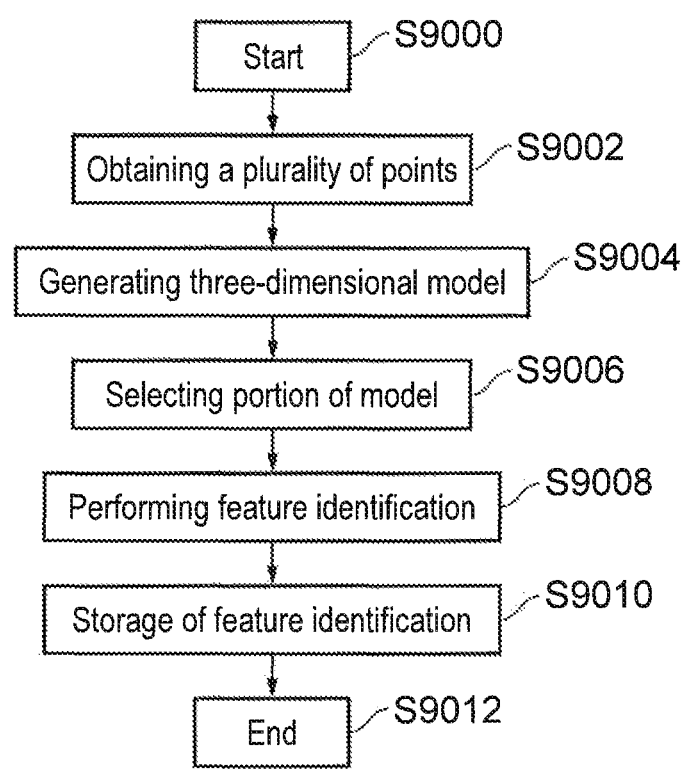
FIG. 9 illustrates a method of image processing according to embodiments of the disclosure.

FIG. 9 illustrates a method of image processing according to embodiments of the disclosure. The method according to embodiments of the disclosure may be performed on the device 100 as according to FIG. 1.

The method steps S9000 to S9008 are substantially the same as method steps S6000 to S6008 described with above with reference to FIG. 6. For brevity, a repetition regarding the details of these method steps will not be included at this stage.

According to the method illustrated with reference to FIG. 9, once the feature identification has been performed, the method proceeds to step S9010. Step S9010 comprises storing the result of the feature identification. Furthermore, in certain embodiments, step S9010 comprises subsequent use of the stored feature identification results in further analysis of the objects which have been identified.

It will be appreciated that the results of the feature identification may be stored internal or external to the device 100 (such as in storage unit 106) as described with reference to FIG. 1 of the present disclosure.

According to embodiments of the disclosure, the method may comprise storing object data indicative of at least one of the result obtained from the feature identification and the at least one three-dimensional model of the object in association with time data indicative of a time at which the plurality of images corresponding to a plurality of different views of the object in the scene were captured.

Consider the situation illustrated with reference to FIG. 5B. The plurality of image capture devices capture a plurality of images at a given time instance, and may capture a series of images over a given time duration. According to embodiments of the disclosure, once the object 5012 has been identified in the plurality of images captured at a given time instance, the method comprises storing at least one of the result of the identification, the time instance at which those images were capture or the three-dimensional model of the player in a storage unit. It will be appreciated that the selection of the features to store may vary in accordance with the situation.

Furthermore, the method according to embodiments of the disclosure may comprise performing a comparison between the object data associated with a first set of time data and object data for the same object associated with a second set of time data, and determining a property of the object from the comparison.

That is, once the object has been identified in a series of images, the series of image being obtained at different instances of time over a given time duration, the method may comprise using that information in order to determine a property of the object or objects which have been identified in the images. In certain embodiments, such a property of the object could correspond to at least one of a movement pattern of the object in the scene, an action being performed by the object, a time without movement of the object, a performance indicator of the object, a status of the object or the like. For example, a performance indicator of the person could relate to the distance the identified person travels around the scene or the speed at which they travel, based upon an analysis of images of the scene captured over a given time duration.

That is, since the method according to embodiments of the disclosure enables the objects to be uniquely identified, it is possible to provide individual analysis of the objects from a sequence of images of the scene obtained over a given time duration.

Of course, the properties which are determined from the temporal identification data are not particularly limited to these examples. Rather, any suitable properties can be determined, as desired, depending on the context of the situation.

Alternatively or in addition, the method according to embodiments of the disclosure may comprise using the stored object data associated with a first time data when performing feature identification for a plurality of images captured at a second time different from the time indicated by the first time data.

That is, in certain embodiments of the disclosure, the locations of certain identified objects in a plurality of images captured at a first instance of time could be used as a constraint to further improve the efficiency of the identification of the objects in subsequent plurality of images captured at a second instance of time later than the first instance of time. Consider the situation illustrated with reference to FIG. 5B of the application as filed. When the object 5012 is identified as being at a first location in the scene at a first instance of time, the method according to embodiments of the disclosure may comprise forming an expectation of the location of the object 5012 at a subsequent time. For example, the expected location could be based upon a determined speed of the object, a time difference between the time of capture of the first plurality of images and the second plurality of images, the type of object, or the like.

Using the expected location of the object in this manner improves the efficiency of feature identification processing (by reducing the list of potential targets) and provides an indication of an erroneous identification. That is, if an object is subsequently located outside an expected region, then the identification could be flagged as a spurious or erroneous identification which requires verification through more detailed feature identification. Alternatively, verification could be provided through the input unit 106 by a user such as a controller or supervisor or the like.

Furthermore, it will be appreciated that while aspects of the methods corresponding to FIGS. 8 and 9 of the present disclosure have been described in isolation, it will be appreciated that the present disclosure is not particularly limited in this respect. That is, any combination of these features may be performed in accordance with embodiments of the disclosure as required in accordance with the situation to which the embodiments of the disclosure are applied.

Additional Modifications

While aspects of the method according to FIGS. 6, 7 and 8 have been described with reference to a sporting event, such as a football match or the like, it will be appreciated that the present disclosure is not particularly limited in this regard. That is, the method according to embodiments of the disclosure may be applied to images obtained from image capture devices regardless of the content of the images. For example, the method according to embodiments of the disclosure may be advantageously applied to images captured of sporting events other than football matches, such as rugby matches, cricket matches or the like. Alternatively, the method according to embodiments of the disclosure may be applied to images of other scenes comprising at least one object, such as images of a crowd of people.

Moreover, since the objects in the images can be rapidly identified, embodiments of the disclosure may be applied to situations whereby it is required to track objects through a plurality of images of a scene. For example, embodiments of the disclosure may be used in CCTV security systems or the like. In addition, embodiments of the disclosure may be used to track objects other than people through a plurality of images, either through direct identification of those objects or through their association with identified people in the images.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure can be defined according to the following numbered paragraphs:

1. A method of image processing, the method comprising:
locating at least one object in an image of a scene;
selecting at least a portion of the image of the scene in accordance with the location of the at least one object in the image of the scene;
generating a different image of the at least one object in accordance with the selected portion of the image of the scene, the different image comprising the at least one object and being smaller than the image of the scene;
detecting a plurality of points corresponding to parts of the at least one object located in the scene using the different image of the at least one object.

2. The method according to Clause 1, wherein locating the at least one object in the image of the scene comprises performing a foreground object extraction on the image of the scene.

3. The method according to Clause 2, wherein performing the foreground extraction comprises performing at least one of a chromatic distribution analysis of the image, a contrast distribution analysis of the image or a frame differencing with respect to a previous image of the scene.

4. The method according to Clause 1, wherein locating the at least one object in the image comprises comparing the image of the scene with a predetermined target image of the object.

5. The method according to Clause 1, wherein selecting the at least one portion of the image of the scene in accordance with the location of the at least one object comprises selecting a region of the image of the scene of a predetermined size around the at least one object; and wherein generating the different image of the scene comprises deleting the portion of the image of the scene outside the selected region of the image of the scene.

6. The method according to Clause 1, wherein selecting the at least one portion of the image of the scene in accordance with the location of the at least one object comprises selecting a portion of the image outside a region of predetermined size around the at least one object; and wherein generating the different image of the scene comprises deleting the selected portion of the image of the scene.

7. The method according to Clauses 5 or 6, wherein the different image of the at least one object is a cut-out of the at least one object from the image of the scene.

8. The method according to Clause 1, wherein prior to detecting a plurality of points, the method comprises magnifying the different image of the object to a predetermined size.

9. The method according to Clause 1, wherein prior to detecting a plurality of points, the method comprises performing a resolution adjustment on the different image in order to upscale or downscale the different image to a predetermined resolution.

10. The method according to Clause 1, wherein when selecting the portion of the at least one object, the method comprises storing the location of the at least one object in the original image in a storage unit.

11. The method according to Clause 10, comprising using the plurality of points corresponding to parts of the at least one object and the location of the at least one object in the image of the scene to replace the at least one object in the image of the scene with the corresponding plurality of points.

12. The method according to Clause 10, comprising storing an association between the plurality of points and the location of the at least one object in the storage unit.

13. The method according to Clause 10, comprising generating a resultant image of the plurality of points for each of the at least one object located in the scene, and storing an association between the resultant image of the plurality of points and the location of the object in the scene.

14. The method according to Clause 1, wherein the different image of the at least one object is smaller than the image of the scene in at least one image dimension.

15. The method according to Clause 1, wherein the different image of the at least one object is smaller than the image of the scene in at least one of an image size or an image resolution.

16. The method according to Clause 1, wherein the different image has a predetermined aspect ratio.

17. The method according to Clause 1, wherein the image of the scene comprises a plurality of objects, and wherein generating the different image of the plurality of objects comprises generating a single different image of the plurality of objects, the different image comprising the plurality of objects in a predetermined configuration.

18. The method according to Clause 1, wherein the at least one object is a person and the plurality of points comprise points corresponding to at least one limb of the person.

19. The method according to Clause 18, wherein the method comprises generating a model for the at least one object in accordance with the plurality of points.

20. The method according to Clause 19, comprising generating a confidence score for the plurality of points in accordance with a biomechanical analysis of the model of the at least one object.

21. The method according to Clause 19, comprising generating a confidence score for the plurality of points in accordance with a second plurality of points obtained for that object from a second image of the scene; the second image of the scene having a different view of the at least one object in the scene.

22. The method according to Clause 21, wherein the image of the scene and the second image of the scene having a different view of the at least one object in the scene are obtained from different image capture devices located around the scene.

23. An apparatus for image processing, the apparatus comprising circuitry configured to:
locate at least one object in an image of a scene;
select at least a portion of the image of the scene in accordance with the location of the at least one object in the image of the scene;
generate a different image of the at least one object in accordance with the selected portion of the image of the scene, the different image comprising the at least one object and being smaller than the image of the scene;
detect a plurality of points corresponding to parts of the at least one object located in the scene using the different image of the at least one object.

24. A computer program product comprising instructions which, when the program is executed by a computer, cause the computer to carry out a method of image processing, the method comprising:
locating at least one object in an image of a scene;
selecting at least a portion of the image of the scene in accordance with the location of the at least one object in the image of the scene;
generating a different image of the at least one object in accordance with the selected portion of the image of the scene, the different image comprising the at least one object and being smaller than the image of the scene;
detecting a plurality of points corresponding to parts of the at least one object located in the scene using the different image of the at least one object.

The invention claimed is:

1. A method of image processing, the method comprising:
locating at least one object in an image of a scene;
selecting at least a portion of the image of the scene in accordance with the location of the at least one object in the image of the scene;
generating a different image of the at least one object in accordance with the selected portion of the image of the scene, the different image comprising the at least one object and the different image being smaller than the image of the scene;
detecting a plurality of points corresponding to parts of the at least one object located in the scene using the different image of the at least one object;
wherein the image of the scene comprises a plurality of objects, and wherein generating the different image of the plurality of objects comprises generating a single different image of the plurality of objects, the different image comprising the plurality of objects in a predetermined configuration,
wherein selecting the at least one portion of the image of the scene in accordance with the location of the at least one object comprises selecting a region, or selecting an outside portion of the image outside the region, of the image of the scene of a predetermined size around the at least one object, and
wherein generating the different image of the scene comprises deleting the portion of the image of the scene outside the selected region of the image of the scene or deleting the selected outside portion of the image of the scene.

2. The method according to claim 1, wherein locating the at least one object in the image of the scene comprises performing a foreground object extraction on the image of the scene.

3. The method according to claim 2, wherein performing the foreground extraction comprises performing at least one of a chromatic distribution analysis of the image, a contrast distribution analysis of the image or a frame differencing with respect to a previous image of the scene.

4. The method according to claim 1, wherein locating the at least one object in the image comprises comparing the image of the scene with a predetermined target image of the object.

5. The method according to claim 1, wherein the different image of the at least one object is a cut-out of the at least one object from the image of the scene.

6. The method according to claim 1, wherein prior to detecting a plurality of points, the method comprises magnifying the different image of the object to a predetermined size.

7. The method according to claim 1, wherein prior to detecting a plurality of points, the method comprises performing a resolution adjustment on the different image in order to upscale or downscale the different image to a predetermined resolution.

8. The method according to claim 1, wherein when selecting the portion of the at least one object, the method comprises storing the location of the at least one object in the original image in a storage unit.

9. The method according to claim 8, comprising using the plurality of points corresponding to parts of the at least one object and the location of the at least one object in the image of the scene to replace the at least one object in the image of the scene with the corresponding plurality of points.

10. The method according to claim 8, comprising storing an association between the plurality of points and the location of the at least one object in the storage unit.

11. The method according to claim 8, comprising generating a resultant image of the plurality of points for each of the at least one object located in the scene, and storing an association between the resultant image of the plurality of points and the location of the object in the scene.

12. The method according to claim 1, wherein the at least one object is a person and the plurality of points comprise points corresponding to at least one limb of the person.

13. The method according to claim 12, wherein the method comprises generating a model for the at least one object in accordance with the plurality of points.

14. The method according to claim 13, comprising generating a confidence score for the plurality of points in accordance with a biomechanical analysis of the model of the at least one object.

15. The method according to claim 14, comprising generating a confidence score for the plurality of points in accordance with a second plurality of points obtained for that object from a second image of the scene; the second image of the scene having a different view of the at least one object in the scene.

16. The method according to claim 15, wherein the image of the scene and the second image of the scene having a different view of the at least one object in the scene are obtained from different image capture devices located around the scene.

17. An apparatus for image processing, the apparatus comprising circuitry configured to:
  locate at least one object in an image of a scene;
  select at least a portion of the image of the scene in accordance with the location of the at least one object in the image of the scene;
  generate a different image of the at least one object in accordance with the selected portion of the image of the scene, the different image comprising the at least one object and the different image being smaller than the image of the scene;
  detect a plurality of points corresponding to parts of the at least one object located in the scene using the different image of the at least one object,
  wherein the circuitry is further configured to select the at least one portion of the image of the scene in accordance with the location of the at least one object by being configured to select a region, or select an outside portion of the image outside the region, of the image of the scene of a predetermined size around the at least one object, and
  wherein the circuitry is further configured to generate the different image of the scene by being configured to delete the portion of the image of the scene outside the selected region of the image of the scene or delete the selected outside portion of the image of the scene.

18. A non-transitory computer program product comprising instructions which, when the program is executed by a computer, cause the computer to cavy out a method of image processing, the method comprising:
  locating at least one object in an image of a scene;
  selecting at least a portion of the image of the scene in accordance with the location of the at least one object in the image of the scene;
  generating a different image of the at least one object in accordance with the selected portion of the image of the scene, the different image comprising the at least one object and the different image being smaller than the image of the scene;
  detecting a plurality of points corresponding to parts of the at least one object located in the scene using the different image of the at least one object,
  wherein selecting the at least one portion of the image of the scene in accordance with the location of the at least one object comprises selecting a region, or selecting an outside portion of the image outside the region, of the image of the scene of a predetermined size around the at least one object, and
  wherein generating the different image of the scene comprises deleting the portion of the image of the scene outside the selected region of the image of the scene or deleting the selected outside portion of the image of the scene.

* * * * *